United States Patent [19]
Moriwaki et al.

[11] Patent Number: 5,686,021
[45] Date of Patent: Nov. 11, 1997

[54] LIQUID CRYSTAL DISPLAY DEVICE, METHODS OF PRODUCING AND DRIVING THE LIQUID CRYSTAL DISPLAY DEVICE, AND LIQUID CRYSTAL COMPOSITION

[75] Inventors: Fumio Moriwaki; Satoshi Hachiya; Hiroyuki Endo, all of Sodegaura, Japan

[73] Assignee: Idemitsu Kosan Co., Ltd., Tokyo, Japan

[21] Appl. No.: 534,982

[22] Filed: Sep. 27, 1995

[30] Foreign Application Priority Data

Oct. 4, 1994 [JP] Japan ..................... 6-240096

[51] Int. Cl.$^6$ .................... C09K 19/34; C09K 19/52; C09K 19/12; C09K 19/20
[52] U.S. Cl. ................... 252/299.61; 252/299.01; 252/299.65; 252/299.66; 252/299.67
[58] Field of Search ................ 252/299.01, 299.61, 252/299.66, 299.67

[56] References Cited

U.S. PATENT DOCUMENTS 5,076,962 12/1991 Furukawa et al. ............... 252/299.65

FOREIGN PATENT DOCUMENTS 0587280 3/1994 European Pat. Off. .

*Primary Examiner*—C. H. Kelly
*Attorney, Agent, or Firm*—Antonelli, Terry, Stout & Kraus, LLP.

[57] ABSTRACT

A liquid crystal display device, which containing a liquid crystal in each display element comprising at least two oriented liquid crystal phases including a most-quickly-responding liquid crystal phase and a most-slowly-responding liquid crystal phase, the response time of the most-quickly-responding liquid crystal phase being at most 1/50 times as long as that of the most-slowly-responding liquid crystal phase, all layer normal lines and/or alignment directions of the liquid crystal phases being directed substantially in one direction.

15 Claims, 4 Drawing Sheets

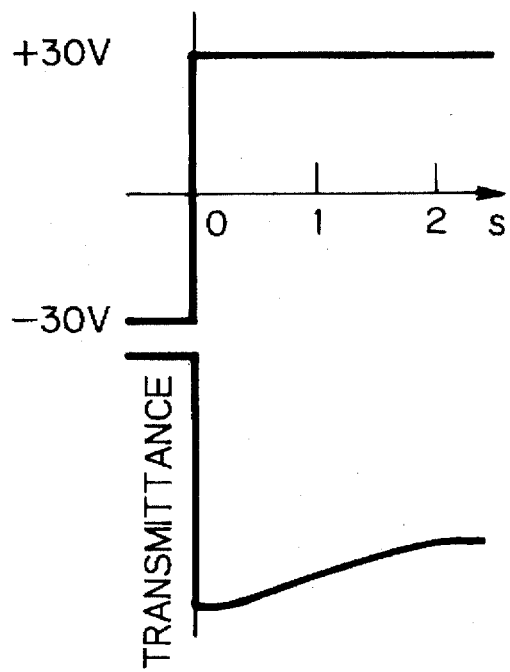
Fig. 4(a)
Fig. 4(b)
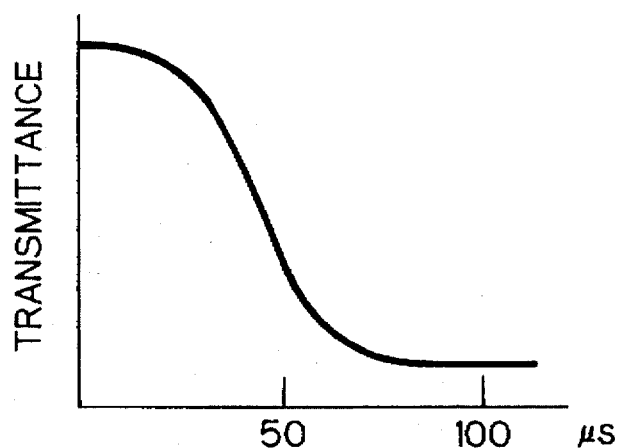
Fig. 5(a)
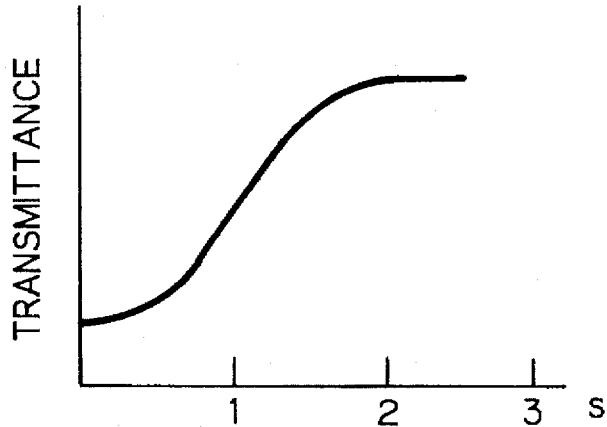
Fig. 5(b)

LIQUID CRYSTAL DISPLAY DEVICE, METHODS OF PRODUCING AND DRIVING THE LIQUID CRYSTAL DISPLAY DEVICE, AND LIQUID CRYSTAL COMPOSITION

BACKGROUND OF THE INVENTION (a) Field of the Invention

The present invention relates to a liquid crystal display device which is useful as a display device in optoelectronics fields, and also relates to the methods of producing and driving the liquid crystal display and to a liquid crystal composition useful as a liquid crystal material for the liquid crystal display device.

(b) Related Art

While the use of liquid crystal display devices in panel-type or portable display apparatuses has attracted interest because liquid crystal display devices are thin and light in weight and consume little electricity, researches are being made to improve the display quality of liquid crystal optical devices. Particularly, liquid crystals generally have a shortcoming of being slow in responding to electric field, and liquid crystal display devices need the development and use of liquid crystals of high response speed to perform highly fine display of high quality.

Thus attention has been paid to ferroelectric liquid crystals which are superior to other liquid crystals in exhibiting quick response, memory effect and bistability. Although extensive researches of display devices using ferroelectric liquid crystals have been made since Clark and Lagerwall proposed applicable display systems [Japanese Patent Application Kokai Koho (Laid-open) Nos. 56-107216 and 63-153521], there are few examples of practical application for the following reasons.

For example, liquid crystal display devices using low molecular weight ferroelectric liquid crystals respond quickly to electric field but have the shortcoming of having poor impact resistance and requiring complicated production processes due to the necessity of disposing orientation control layers to align the liquid crystals.

To overcome such shortcomings in low molecular weight ferroelectric liquid crystals, ferroelectric liquid-crystalline polymers were developed [International Publication No. 92/01731, Japanese Patent Application Kokai (Laid-open) No. 6-73179, etc.]. Since ferroelectric liquid-crystalline polymers have good film formability and can be aligned by shearing orientation techniques without using orientation control layers, their use for the production of liquid crystal display devices facilitates the production of display devices with excellent alignment properties and high impact resistance. Ferroelectric liquid-crystalline polymers, however, are generally slow in responding to electric field, and the response speed of liquid crystal display devices using them has been too low to perform display of sufficiently high quality.

As a means of overcoming such defects of the liquid crystal display devices using low molecular weight ferro-electric liquid crystals and of those using ferroelectric liquid-crystalline polymers, it was proposed to use homogeneous compositions of ferroelectric liquid-crystalline polymers and low molecular weight smectic liquid crystals containing ferroelectric liquid crystals [Japanese Patent Application Kokai Koho (Laid-open) Nos. 5-202358 and 6-73179, etc.). Both the alignment properties and the response properties of the liquid crystal display devices using such homogeneous compositions are relatively improved, but are not yet sufficient for display systems requiring extremely quick response, such as those for moving picture.

On the other hand, it was also proposed to use, as a liquid crystal component, only low molecular weight ferroelectric liquid crystals exhibiting quick response and to use, as an ingredient for improving aligning ability and impact resistance, non-liquid-crystalline polymers which do not take part in response. For example, in Japanese Patent Application Kokai Koho (Laid-open) Nos. 2-36299 and 2-232293 are disclosed liquid crystal compositions comprising low molecular weight ferroelectric liquid crystals and adhesives. The liquid crystal display devices employing such liquid crystal compositions are excellent both in alignment properties and in response properties. The display devices, however, have the disadvantage that the adhesives on one hand tend to change the properties of liquid crystals and on the other hand scatter the light to lower the contrast. In Japanese Patent Application Kokai Koho (Laid-open) No. 61-47427 are disclosed liquid crystal compositions comprising low molecular weight ferroelectric liquid crystals and thermoplastic amorphous polymers, such as polystyrene. Although the liquid crystal compositions exhibit excellent response properties and are free from the above-described deterioration of liquid crystals due to adhesives, orientation becomes difficult as the ratio of the polymers is increased to improve strength.

Further, in Japanese Patent Application Kokai Koho (Laid-open) No. 4-281425 is disclosed a liquid crystal display device wherein polymers, such as liquid-crystalline polymers, are dispersed in a ferroelectric liquid crystal phase at intervals of about 1 to 2 µm and are then aligned. The liquid crystal display device, however, is insufficient in impact resistance since the polymers, such as liquid-crystalline polymers, form no pillars between the substrates.

SUMMARY OF THE INVENTION

The present invention has been made in consideration of the above-described situation, and the object of the present invention is to provide a liquid crystal display device which is excellent both in orientation stability and in impact resistance and also exhibits quick response.

Another object of the present invention is to provide a method of producing the liquid crystal display device and to provide a driving method which enables the liquid crystal display device to fully exhibit its quick response to perform highly fine display with high quality.

Another object of the present invention is to provide a liquid crystal composition which can reconcile orientation stability and impact resistance with quick response and is useful as a liquid crystal material for the above-described liquid crystal display device.

As the results of our researches for achieving the object of the present invention, we have found that when there are two kinds of liquid crystal phases, one for enabling quick response and one for giving aligning ability and impact resistance, the lowering of contrast due to the disorder of alignment at the interface between phases can be prevented by equalizing the directions of the layer normal lines or the alignment directions of all phases. Although liquid crystals having excellent alignment properties and high impact resistance, such as liquid-crystalline polymers, generally have low response speed as described above, we have also found that the deterioration of response properties of liquid crystal display devices can be inhibited by using such liquid crystals in a phase for improving alignment properties and impact resistance, increasing the difference in response speed from the quickly-responding liquid crystal phase, and by driving the liquid crystal devices by a specific driving method. We have completed the present invention on the basis of such findings.

That is, the present invention provides a liquid crystal display device, comprising a liquid crystal which is disposed between a couple of substrates bearing on their surfaces facing each other their respective electrode structures, at least one of the substrates being transparent, the liquid crystal in each display element comprising at least two oriented liquid crystal phases, the liquid crystal phases including a most-quickly-responding liquid crystal phase responding to an electric field at the shortest response time A and a most-slowly-responding liquid crystal phase responding to the same electric field at the longest response time B, the response time A being at most $1/50$ times the response time B, when all the liquid crystal phases have layer structures having layer normal lines, the layer normal lines being directed substantially in one direction, when none of the liquid crystal phases have a layer structure, the alignment of all the liquid crystal phases being directed substantially in one direction, when one or more of the liquid crystal phases have layer structures having layer normal lines and one or more other liquid crystal phases have no layer structure, the layer normal lines of the former liquid crystal phases and the alignment of the latter liquid crystal phases being directed substantially in one direction.

The present invention also provides a method of producing a liquid crystal display device which is an embodiment of the liquid crystal display device of the present invention, and wherein the most-quickly-responding liquid crystal phase comprises as a main component a low molecular weight ferroelectric liquid crystal or a low molecular weight ferroelectric liquid crystal composition, and the most-slowly-responding liquid crystal phase comprises as a main component a ferroelectric liquid-crystalline polymer having a weight average molecular weight of 2,000 to 200,000 or a ferroelectric liquid-crystalline polymer composition containing a ferroelectric liquid-crystalline polymer having a weight average molecular weight of 2,000 to 200,000, and when the liquid crystal display device is driven, the most-slowly-responding liquid crystal phase is in a frozen glass state or exhibits a high-order smectic phase which does not respond to an electric field, and the direction of the alignment of the most-slowly-responding liquid crystal phase is substantially the same as the direction of one of the two kinds of alignment of the most-quickly-responding liquid crystal phase which are switched therebetween by driving the liquid crystal display device. The method comprises, during an electric field is being applied in one direction between the electrode structures of the substrates supporting the aligned liquid crystal phases, or after an electric field is applied in one direction between the electrode structures of the substrates supporting the aligned liquid crystal phases and the application of the electric field is stopped, the liquid crystal phases are cooled or allowed to stand at room temperature, so that the most-slowly-responding liquid crystal phase is frozen into a glass state or is transferred to a high-order smectic phase which does not respond to an electric field.

The present invention further provides a method of driving a liquid crystal display device which is an embodiment of the liquid crystal display device of the present invention and wherein the most-quickly-responding liquid crystal phase is a ferroelectric phase. The method comprises applying between the electrode structures a pulse voltage having a voltage and a pulse duration which are sufficient to drive the most-quickly-responding liquid crystal phase but is insufficient to drive the most-slowly-responding liquid crystal phase.

The present invention further provides a liquid crystal composition which is useful as the liquid crystal contained in the liquid crystal display device of the present invention. The liquid crystal composition separates into at least two liquid crystal phases having different response times to an electric field, the liquid crystal phases including a most-quickly-responding liquid crystal phase responding to an electric field at the shortest response time A and a most-slowly-responding liquid crystal phase responding to the same electric field at the longest response time B, the response time A being at most one fiftieth of the response time B.

The liquid crystal display device of the present invention is excellent in alignment stability and impact resistance and also exhibits quick response.

BRIEF DESCRIPTION OF THE DRAWINGS

FIG. 4(a) and FIG. 4(b) are graphical illustration of the relationship between voltages applied to a liquid crystal display device as shown in FIG. 4(a) and the values of transmittance.

FIG. 5(a) and FIG. 5(b) are graphical illustration showing the changes of the transmittance of liquid crystal display devices.

DESCRIPTION OF THE PREFERRED EMBODIMENTS

Liquid Crystal Display Device and Method of Producing the Preferred Embodiment of the Liquid Crystal Display Device In the liquid crystal display device of the present invention, the liquid crystal in each display element comprises at least two kinds of liquid crystal phases.

Figure 1:
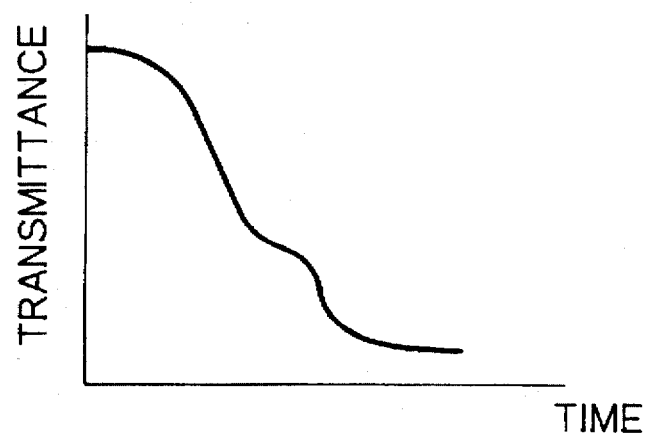
FIG. 1 is a graph showing the response behavior of a liquid crystal optical device wherein each display element comprises two kinds of liquid crystal domains and the liquid crystal domains respond to an electric field separately.

When plural kinds of liquid crystal phases are present in each display element of a liquid crystal display device, the liquid crystal phases necessarily have different compositions and, when the device is driven, the liquid crystal phases respond at different response speeds even to an applied electric field having one voltage and one pulse duration. For example, when two kinds of liquid crystal domains are present in one display element and respond respectively to an electric field, the display element on the whole responds in the manner as shown in FIG. 1.

Further, according to the present invention, in each display element, the response time of the most-quickly-responding liquid crystal phase is at most 1/50 times as long as that of the most-slowly-responding liquid crystal phase. Thus, by controlling the voltage or pulse duration of the electric field applied to drive the liquid crystal display device, the liquid crystal display device easily becomes to contain at least one liquid crystal phase responding to the electric field and at least one liquid crystal phase not responding to the electric field. Such a liquid crystal display device can easily be endowed with quick response ability, alignment stability and high impact resistance by on one hand making the liquid crystal phase responding to electric field play a role as a part enabling quick response and on the other hand making the liquid crystal phase not responding to electric field play a role as a part giving alignment stability and impact resistance. Further, in the liquid crystal display device of the present invention, when the most-slowly-responding liquid crystal phase is present continuously in a direction perpendicular to the substrate in at least one area between the substrates, the pillars of the most-slowly-responding liquid crystal phase further improves the alignment stability and impact resistance.

If the response time of the most-quickly-responding liquid crystal phase is more than 1/50 times as long as that of the most-slowly-responding liquid crystal phase, in case every liquid crystal phase have poor threshold properties, it will be difficult to make a situation where at least one kind of liquid crystal phase responds to electric field while at least one kind of liquid crystal phase does not respond, by controlling the voltage or pulse duration of the applied electric field. The response time of the most-quickly-responding liquid crystal phase is preferably at most 1/500 times as long as that of the most-slowly-responding liquid crystal phase.

The comparison of response time is made by applying various pulse voltages with a uniform voltage, and comparing the minimum pulse durations which cause switching between light and dark in liquid crystal phases, respectively.

Thus, when a liquid crystal phase A is switched between light and dark by applying a pulse voltage of a voltage for a time a, and a liquid crystal phase B is not switched between light and dark by applying a pulse voltage of the same voltage for a time b (b>a), the electric field response time of the liquid crystal phase A is judged to be at most a/b times as long as that of the liquid crystal phase B.

In the liquid crystal display device of the present invention, since all the layer normal lines and/or alignment directions of the liquid crystal phases are substantially the same (for example, all the directions of the layer normal lines of liquid crystal phases having layer structures, such as the smectic layers of chiral smectic C phase, and all the directions of the alignment directions of liquid crystal phases having no layer structures, such as nematic phase, are substantially the same), the disorder of alignment hardly occurs in the interfaces between liquid crystal phases. Thus the lowering of contrast due to the disorder of the alignment of liquid crystals can be effectively inhibited.

The most-quickly-responding liquid crystal phase is preferably a ferroelectric phase, such as chiral smectic C phase with excellent response properties. When the most-quickly-responding liquid crystal phase is a ferroelectric phase, the lowering of contrast can be minimized by the method which will be described later.

The most-quickly-responding liquid crystal phase is preferably a ferroelectric phase as described above, and hence its main component preferably is a ferroelectric liquid crystal compound or a ferroelectric liquid crystal composition comprising two or more components, and those with low molecular weights are particularly preferable because of their quick response.

The preferred main component of the most-slowly-responding liquid crystal phase is a material being excellent both in alignment properties and in impact resistance, namely various liquid-crystalline polymers. Any liquid-crystalline polymer may be used suitable, so far as it can separate from the components of the most-quickly-responding liquid crystal phase, such as low molecular weight liquid crystals. To perform the control of the alignment direction of the most-slowly-responding liquid crystal phase as described later, it is preferable that both the most-slowly-responding liquid crystal phase (such as a liquid crystal phase whose main component consists of liquid-crystalline polymers) and the most-quickly-responding liquid crystal phase (such as a liquid crystal phase whose main component consists of low molecular weight liquid crystals) have a ferroelectric phase within a specific temperature range. Therefore, the preferred main component of the most-slowly-responding liquid crystal phase is a ferroelectric liquid-crystalline polymer or a ferroelectric liquid-crystalline polymer composition.

When the liquid crystal display device is being driven, the most-slowly-responding liquid crystal phase needn't respond to electric field and may be in a state of a high-order smectic phase which does not respond to electric field, such as smectic I phase or smectic F phase, or a so-called frozen glass state wherein the alignment of chiral smectic C phase is maintained but has been made not to respond to electric field. To produce liquid crystal display devices which are endowed with all of high response speed, alignment stability and high impact resistance by the above-described apportionment of roles, such states as described above are advantageous since the most-slowly-responding liquid crystal phase can be used as the part for endowing alignment stability and impact resistance without being made not to respond by controlling the pulse duration or voltage of applied pulse.

The detail and examples of the components of these liquid crystal phases will be described later in the part describing the liquid crystal composition suitable for the liquid crystal display device of the present invention.

To realize the above-described advantages of the liquid crystal display device of the present invention, the presence, in each display element, of two liquid crystal phases in minimum is sufficient, namely one liquid crystal phase which slowly responds to electric field and one liquid crystal phase which quickly responds to electric field in a response time which is at most one fiftieth of that of the slowly-responding liquid crystal phase.

In this case, the desirable amount of the liquid crystals constituting the slowly-responding liquid crystal phase is 5 to 40% by weight, preferably 6 to 27% by weight, based on the total of the liquid crystals constructing both liquid crystal phases. If it is less than 5% by weight, phase separation may tend to be insufficient, and if more than 40% by weight, the area responding to pulse voltage may be too small to make high contrast.

In such a case wherein the liquid crystal in each display element consists of only two kinds of liquid crystal phases, the preferred material of the slowly-responding liquid crystal phase is also one with excellent aligning properties, namely various liquid-crystalline polymers. As described above, the conventional liquid crystal device which contains a composition comprising low molecular weight liquid crystals and polystyrene involves the problem that increasing the ratio of the polymer disturbs alignment operation. On the other hand, liquid-crystalline polymers themselves align, and the presence thereof even in an amount of 20% by weight or more does not disturb alignment operation and hence makes it easy to produce liquid crystal display devices of a high degree of alignment. Also using liquid-crystalline polymers advantageously decreases the possibility of the peeling of substrates during alignment procedures.

When there are three or more kinds of liquid crystal phases, the liquid crystal phases other than the most-quickly-responding liquid crystal phase and the most-slowly-responding liquid crystal phase, for example, take charge of quick response. By using the difference in the response speeds of the liquid crystal phases taking charge of quick response, display with grading contrast can be conducted by making the liquid crystal phases respond selectively by selecting pulse duration. From the viewpoint of their charge of quick response, such liquid crystal phases are preferably ferroelectric phases, and it is also preferable that the response speeds thereof is not so different from that of the most-quickly-responding liquid crystal phase. For example, the particularly preferred are those which respond to electric field in a response time not more than 5 times as long as that of the most-quickly-responding liquid crystal phase.

Hereinafter described is the method of minimizing the lowering of contrast by using a ferroelectric phase as the most-quickly-responding liquid crystal phase.

When the most-quickly-responding liquid crystal phase is a ferroelectric phase, it has two stable states, which can be switched with each other.

Figure 2:
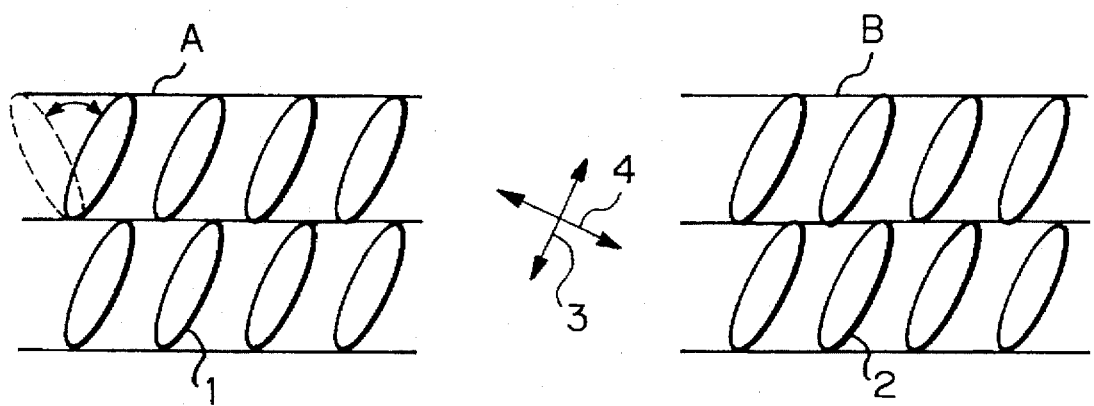
FIG. 2 is a schematic view illustrating the alignment of the most-quickly-responding liquid crystal phase, the alignment of the liquid-crystalline side chains of the liquid crystal polymer of the most-slowly-responding liquid crystal phase, both in the liquid crystal display device of the present invention, and the polarizing axes of crossed Nicols.

Imagine a case wherein the most-slowly-responding liquid crystal phase is in a frozen glass state or a high-order smectic phase which does not respond to electric field when the liquid crystal display device is being driven, and its alignment direction is substantially the same as the direction of one of the above-described two kinds of alignment of the most-quickly-responding liquid crystal phase. FIG. 2 schematically illustrates one example of the alignment of the liquid crystal phases which are in such a state as described above. A represents the two kinds of alignment of the most-quickly-responding liquid crystal phase, wherein the liquid crystal molecules 1 of a low molecular weight liquid crystal are aligned in a state capable of being switched between two stable states, one shown by a dotted line and one shown by solid lines. B represents the alignment of the most-slowly-responding liquid crystal phase, wherein the liquid-crystalline side chains of a liquid-crystalline polymer are made not to respond to electric field and are aligned substantially in the same alignment direction as that of one of the two stable states of the liquid crystal molecules of the low molecular weight liquid crystal. When such a liquid crystal display device is arranged between crossed Nicols having polarization axes 3 and 4 crossing each other so that one of the polarization axes is parallel with the alignment direction of one of the two stable states of the most-quickly-responding liquid crystal phase which is substantially the same as the alignment direction of the most-slowly-responding liquid crystal phase, the dark state is more darkened, that is, the transmission of light passing through the most-slowly-responding liquid crystal phase is minimized and the lowering of contrast is minimized.

Such a state is realized, according to the above-described suitable production method of the present invention, by using as the liquid crystal material of the most-slowly-responding liquid crystal phase a liquid crystal having a ferroelectric phase and by transferring the most-slowly-responding liquid crystal phase to a high-order smectic phase which does not respond to electric field or by freezing it to glass state.

For example, one should choose for the most-slowly-responding liquid crystal phase a material which has a ferroelectric phase capable of being transferred, by cooling to or allowing to stand at an appropriate temperature ranging for example from −40° to 30° C., to a frozen glass state or a high-order smectic phase which does not respond to electric field and also capable of maintaining the transferred state at room temperature in a driving state of the liquid crystal display device, and one should choose for the most-quickly-responding liquid crystal phase a ferroelectric liquid crystal material which cannot be transferred by the same procedure to a frozen glass state or a high-order smectic phase which does not respond to electric field in a driving state of the liquid crystal display device. While the most-slowly-responding domain is exhibiting a ferroelectric phase, an appropriate direct voltage, for example ranging from 1 to 100 V, is applied to the liquid crystal display device to substantially equalize the alignment direction of the most-slowly-responding liquid crystal phase to the direction of one of the two kinds of alignment of the most-quickly responding liquid crystal phase which are switched therebetween in a driving state of the liquid crystal display device. Thereafter, while the application of the direct voltage is being continued, or after the direct voltage is cut off, the liquid crystal display device is cooled to or allowed to stand at an appropriate temperature, for example ranging from −40° to 30° C., to transfer the most-slowly-responding domain to a frozen glass state or a high-order smectic phase which do not respond to electric field, and is then brought back to room temperature. The minimum number of liquid crystal phases in each display element necessary for this method of minimizing the lowering of contrast is also only two, that is a liquid crystal phase which responds slowly to electric field and a liquid crystal phase which responds quickly to electric field at a response time of at most $\frac{1}{50}$ times as long as that of the slowly responding liquid crystal phase.

Method of Driving Liquid Crystal Display Device

The driving method of the present invention enables the liquid crystal optical device of the present invention to show the above-described remarkable features even when the most-slowly-responding liquid crystal phase is not transferred or frozen to a state which does not respond to electric field. That is, according to the method, the liquid crystal display device is driven by applying between the electrode structures a pulse voltage having a voltage and a pulse duration which are sufficient to drive the most-quickly responding liquid crystal phase but is insufficient to drive the most-slowly-responding liquid crystal phase. This driving method produces a state wherein at least one kind of liquid crystal phase which responds to electric field and at least one kind of liquid crystal phase which does not respond to electric field.

When both the most-quickly-responding liquid crystal phase and the most-slowly-responding liquid crystal phase are ferroelectric liquid crystals which can align in two stable alignment states, it is preferable to the liquid crystal display device by applying between the electrode structures a pulse voltage which has a voltage and pulse duration sufficient for the most-slowly-responding liquid crystal phase to respond, thereby substantially equalizing the direction of the alignment of the most-slowly-responding liquid crystal phase to the direction of one of two kinds of alignment of the most-quickly-responding liquid crystal phase which will be switched therebetween in a driving state of the liquid crystal display device, and then, in the same manner as in the above-described driving method, applying between the electrode structures a pulse voltage which has a voltage and pulse duration sufficient to drive the most-quickly responding liquid crystal phase but insufficient to drive the most-slowly responding liquid crystal phase. Conducting this driving method with crossed Nicols arranged as shown in FIG. 2 makes the dark state more dark, thereby minimizing the lowering of contrast even when the most-slowly-responding liquid crystal phase is not transferred or frozen to a state which does not respond to electric field.

Liquid Crystal Composition

The liquid crystal composition of the present invention is useful as the liquid crystal material for the liquid crystal display device of the present invention, and can be separated into at least two liquid crystal phases responding to an electric field in different response times, and the liquid crystal phases include a most-quickly-responding liquid crystal phase and a most-slowly-responding liquid crystal phase. The response time of the most-quickly-responding liquid crystal phase is at most 1/50 times as long as that of the most-slowly-responding liquid crystal phase.

Among various kinds of the liquid crystal compositions of the present invention, the liquid crystal composition which separates into two liquid crystal phases having different electric field response speeds is exemplified by those comprising the following main components of the most-quickly-responding liquid crystal phase and the most-slowly-responding liquid crystal phase.

MOST-QUICKLY-RESPONDING LIQUID CRYSTAL PHASE

The main component of the most-quickly-responding liquid crystal phase may be any liquid crystal which can separate from the most-slowly-responding liquid crystal phase and quickly responds to electric field, and the examples of the particularly preferred main components include ferroelectric liquid crystals or ferroelectric liquid crystal compositions, which are excellent in quick response, particularly preferably low molecular weight ferroelectric liquid crystals or low molecular weight ferroelectric liquid crystal compositions. Among those, the most preferred is a low molecular weight liquid crystal composition containing 60 to 100% by weight of (1) a low molecular weight ferroelectric liquid crystal having at least one branching structure in each end group or (2) a mixture of at least one optically active low molecular weight compound having at least one branching structure in each end group and an optically inactive smectic C low molecular weight liquid crystal having at least one branching structure in at least one end group. This low molecular weight liquid crystal composition easily separates from the most-slowly-responding liquid crystal. At least one branching structure of each of the low molecular weight ferroelectric liquid crystal and the optically active low molecular weight compound is made by an asymmetric carbon atom which is not racemized, and other branching structure may be optically inactive or racemic. When branching structures are counted, one branching structure is counted per each atom of tertiary carbon, quaternary carbon, tertiary silicon, quaternary silicon and tertiary nitrogen:

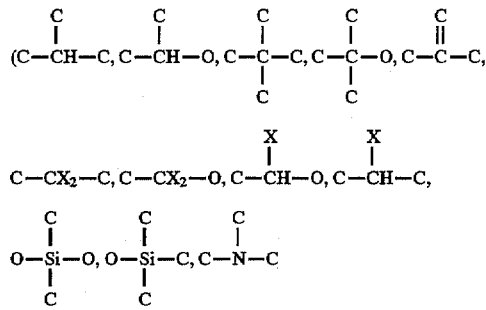

or the like except

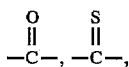

x being F or Cl).

The low molecular weight ferroelectric liquid crystal and the optically active low molecular weight compound has preferably 2 to 7 branching structures, more preferably 3 or 4 branching structures. The optically inactive smectic C low molecular weight liquid crystal has preferably 1 to 6 branching structures, more preferably 1 to 3 branching structures. The examples of the low molecular weight ferroelectric liquid crystals include, among the following compounds (I) and (IIb), the compounds having a ferroelectric liquid crystal phase. Some examples of the optically active low molecular weight compounds include the following compounds (I) and (IIb). The examples of the optically inactive smectic C low molecular weight liquid crystals include, among the following compounds (IIa), the compounds having no optically active alkyl groups and having smectic C phase, and among the following compounds (III), the compounds having smectic C phase.

Among the liquid crystal compounds which are described in the following [1] to [4] and represented by the general formulae (I) to (VII), typical examples of the low molecular weight ferroelectric liquid crystals and low molecular weight ferroelectric liquid crystal compositions are the following (A), (B) and (C):

(A) low molecular weight ferroelectric liquid crystal represented by the generally formula (I);

(B) low molecular weight ferroelectric liquid crystals represented by the general formula (IIb); and (C) low molecular weight ferroelectric liquid crystal compositions which comprise at least one selected from the group consisting of the low molecular weight compounds represented by the general formula (I) and the low molecular weight compounds represented by the general formula (IIb), and at least one selected from the group consisting of the low molecular weight liquid crystals represented by the general formula (III) and having smectic C phase and the low molecular weight liquid crystals represented by the general formulas (IV) to (VII) and having smectic C phase, and optionally at least one low molecular weight liquid crystal selected from the low molecular weight liquid crystals which are represented by the general formula (IIa) and wherein $R^4$ is not optically active.

In the low molecular weight ferroelectric liquid crystal compositions (C), the total of the compounds (I) and the compounds (IIa) is generally at least 40% by weight, preferably 40 to 90% by weight, more preferably 50 to 70% by weight. If it is less than 40% by weight, alignment may become unstable.

[1] Compounds (I) represented by the general formula (I)

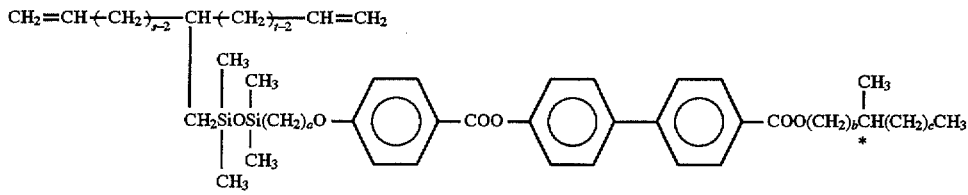

wherein, s and t are each independently an integer of 2 to 5, a is an integer of 4 to 16, b is an integer of 0 to 3, c is an integer of 1 to 7, and * represents an asymmetric carbon atom.

When used as the above-described (A), the compounds (I) should be low molecular weight ferroelectric liquid crystals, but when used as a component of the above-described (C), these needn't be liquid-crystalline.

The preferred examples of the compounds (I) include the following compounds.

solvent in the presence of an alkali agent, to give an etherified ester [compound (b)]. The methyl p-hydroxybenzoate which is allowed to react with the compound (a) in step 1 may be replaced by some p-hydroxybezoate other than the methyl ester. The etherification in step 1 is suitably carried out by mixing the compound (a), methyl p-hydroxybenzoate, the alkali agent and the solvent in any order, and heating the mixture at 60° to 100° C. with stirring. The suitable solvents to be used in step 1 are ketone solvents, such as acetone and 2-butanone, ether inert solvents such as THF and diisopropyl ether, and lower alcohols, such as methanol and ethanol. The suitable alkali agents to be used in step 1 include alkali metal carbonates, such as potassium carbonate and sodium carbonate, and alkali metal hydroxides, such as potassium hydroxide and sodium hydroxide.

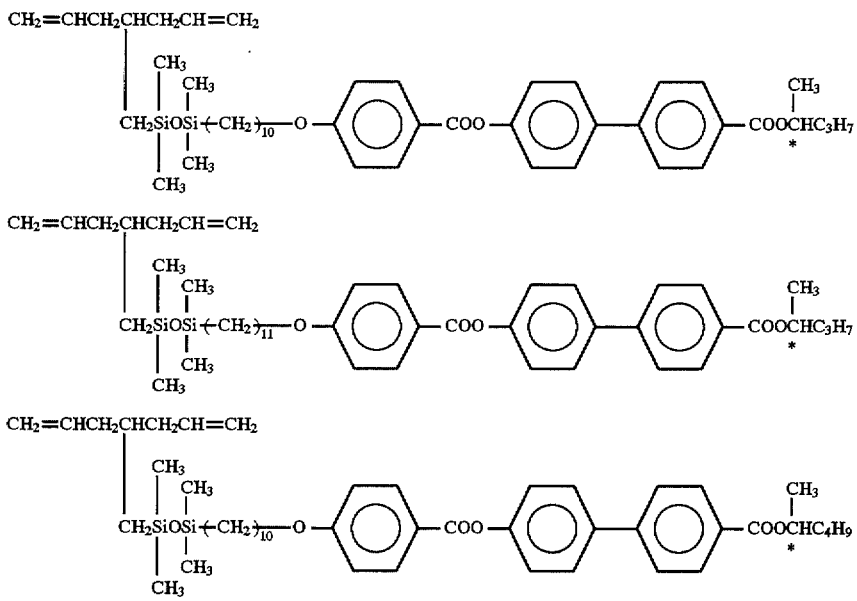

The compounds (I) represented by the general formula (I) are synthesized, for example, by the following method.

step 1

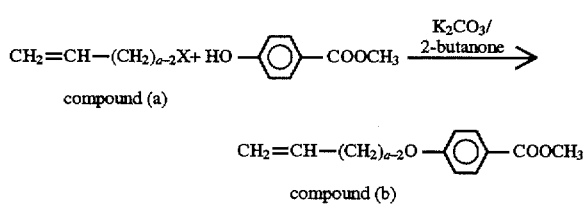

wherein X is a halogen atom or tosyl group.

Etherification is carried out by allowing a mixture of a compound (a) and methyl p-hydroxybenzoate to react in a The typical examples of the compounds (a) include 4-bromo-1-butene, 4-iodo-1-butene, 4-tosyl-1-butene, 5-bromo-1-pentene, 5-iodo-1-pentene, 5-tosyl-1-pentene, 6-bromo-1-hexene, 6-iodo-1-hexene, 6-tosyl-1-hexene, 7-bromo-1-heptene, 7-iodo-1-heptene, 7-tosyl-1-heptene, 8-bromo-1-octene, 8-iodo-1-octene, 8-tosyl-1-octene, 9-bromo-1-nonene, 9-iodo-1-nonene, 9-tosyl-1-nonene, 10-bromo-1-decene, 10-iodo-1-decene, 10-tosyl-1-decene, 11-bromo-1-dodecene, 11-iodo-1-undecene, 11-tosyl-1-undecene, 12-bromo-1-dodecene, 12-iodo-1-dodecene, 12-tosyl-1-dodecene, 13-bromo-1-tridecene, 13-iodo-1-tridecene, 13-tosyl-1-tridecene, 14-bromo-1-tetradecene, 14-iodo-1-tetradecene, 14-tosyl-1-tetradecene, 15-bromo-1-pentadecene, 15-iodo-1-pentadecene, 15-tosyl-1-pentadecene, 16-bromo-1-hexadecene, 16-iodo-1-hexadecene and 16-tosyl-1-hexadecene.

Step 2

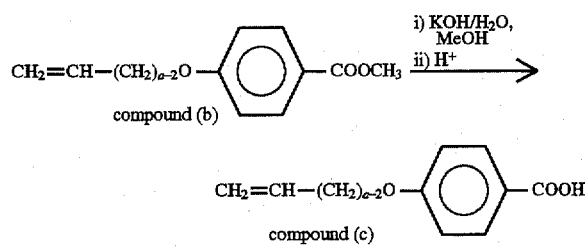

In step 2, only the ester bond of the ester [compound (b)] obtained in step 1 is selectively hydrolyzed, to give a corresponding carboxylic acid [compound (c)]. The hydrolysis may be accomplished by various methods, and it is generally suitable to treat the compound (b) in the presence of an alkali in water or in a mixture of water and an alcohol, optionally by heating. The compound (c) is collected efficiently by adding an acid to the resulting reaction mixture to acidify the pH. The hydrolysis may also be carried out by heating in the mere presence of the alkali catalyst and water, but the addition of the alcohol improves the solubility of the material ester, accelerating the reaction. Some suitable examples of alkalis include alkali metal hydroxides, such as potassium hydroxide and sodium hydroxide, and some suitable examples of the alcohol include water-soluble lower alcohols, such as methanol and ethanol (EtOH). Some suitable examples of acids which may be used for the adjustment of pH include conventional mineral acids, such as hydrochloric acid and sulfuric acid.

Step 3

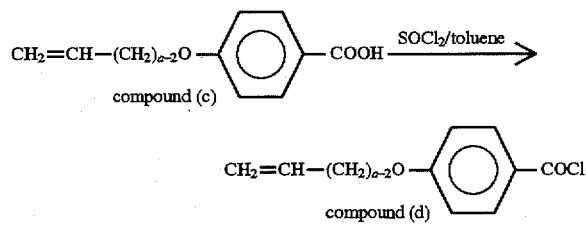

In step 3, the carboxylic acid [compound (c)] obtained in step 2 is converted into an acid chloride [compound (d)] in the presence or absence of a solvent by using an agent for converting acids into halides. This reaction may suitably carried out according to known methods for producing acid halides. For example, the solvent may be selected from conventional ones, such as toluene, and the agent for converting acids into halides may be selected from conventional ones, such as thionyl chloride, phosphorus oxychloride and phosphorus tetrachloride. It is preferable to add a proper amount of accelerator, such as pyridine.

Step 4

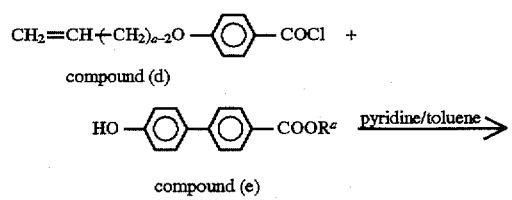

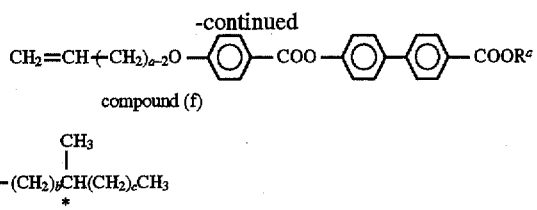

$R^a$: $-(CH_2)_bCH(CH_3)(CH_2)_cCH_3$

The esterification of the acid chloride [compound (d) with a hydroxy compound [compound (e)] is carried out in a solvent in the presence of a proper hydrogen halide acceptor to give a compound (f).

The compound (e) may be produced by any known method. The optically active alkyl group can easily be introduced at the end of the compound (e) by an esterification using an optically active alcohol (HO—$R^a$).

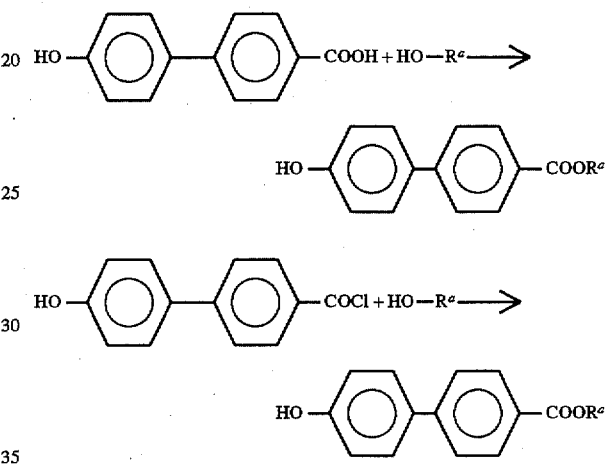

Some examples of the optically active alcohols (HO—$R^a$) include (+)-2-methylbutanol, (−)-2-methylbutanol, (+)-2-methylpentanol, (−)-2-methylpentanol, (+)-3-methylpentanol, (−)-3-methylpentanol, (+)-4-methylhexanol, (−)-4-methylhexanol, (+)-2-methylheptanol, (−)-2-methylheptanol, (+)-2-methyloctanol, (−)-2-methyloctanol, (+)-2-butanol, (−)-2-butanol, (+)-2-pentanol, (−)-2-pentanol, (+)-2-hexanol, (−)-2-hexanol, (+)-2-heptanol, (−)-2-heptanol, (+)-2-octanol and (−)-2-octanol.

The esterification in step 4 may suitably be carried out, for example, by adding a solution of the compound (e) and the hydrogen halide acceptor in proper solvent to the acid chloride [compound (d)] obtained in step 3 or a solution thereof, followed by agitation. When the reactivity is insufficient, the reaction system may be heated to an appropriate temperature, for example ranging from 20° to 80° C. Thus the desired compound (f) is obtained efficiently.

The acid chloride [compound (d)] may be used as the starting material of the esterification after its separation, or a mixture which results from the removal of the solvent and the agent for converting acid into halides out of the reaction mixture obtained in step 3 and containing the acid chloride may also be used. Some suitable examples of the solvents which may be used in the esterification in step 4 include ether inert solvents, such as THF, and hydrocarbon inert solvent, such as toluene and hexane. Some suitable examples of the hydrogen halide acceptors include tertiary amines, such as pyridine and triethylamine (Et$_3$N).

As an alternative to steps 3 and 4, the reaction of the compound (c) with the compound (e) in the presence of a condensing agent, such as DCC (dicyclohexylcarbodiimide), may be employed to give the compound (f).

In this case, the reaction may be accelerated by adding, for example, 4-dimethylaminopyridine. A solvent, such as toluene or methylene chloride, is used. The reaction temperature may be selected from the range of 0° to 80° C., but is generally room temperature. Further, to prevent the intrusion of water, the reaction is carried out in the atmosphere of an inert gas, such as nitrogen or argon, or by using a calcium chloride cylinder, or the like.

The compound (f) may also be produced by other methods, for example, by carrying out the etherification of the compound (a) with a hydroxy compound [compound (g)] represented by the general formula (g)

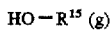

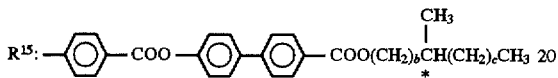

wherein, b, c and * are as defined above, in a solvent in the presence of an alkali agent. For example, the reaction proceeds as follows.

pyl ether, and hydrocarbon halides, such as methylene chloride chloroform and 1,2-dichloroethane. The catalyst has hydrosilyation activity, and the preferred examples include platinum catalysts, such as bis (divinyltetramethyldisiloxane)platinum (0) complex, chloroplatinic acid, platinum (II) acetylacetonato and dicyclopentadienylplatinum chloride. The catalyst may be added alone, or may be added in a form dissolved in a solvent, such as xylene or 2-propanol.

The hydrosilyation is suitably carried out generally at room temperature to 120° C., preferably 60° to 100° C. The reaction time is generally about 1 to 30 hours.

Since the compound (h) obtained in [i] is apt to be decomposed, the reaction solution of [i] is used in the reaction [ii] as it is without separation. In [ii], an equimolar quantity of water is dissolved in a solvent compatible with water, such as THF, and is then added to the reaction solution containing the (h). Although the reaction temperature may be selected from a range of 0° to 80° C., the reaction is generally carried out at room temperature or under cooling with water. A tertiary amine, such as pyridine or triethylamine, is added as a hydrogen halide acceptor. Alternatively, after the reaction solution containing the compound (h) is diluted with diethyl ether or the like, water containing a hydrogen halide acceptor, such as sodium hydroxide, is added thereto, and the mixture is then agitated,

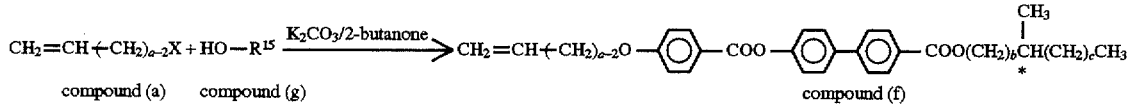

(the solvent, agent and reaction conditions are the same as those in step 1)

Step 5

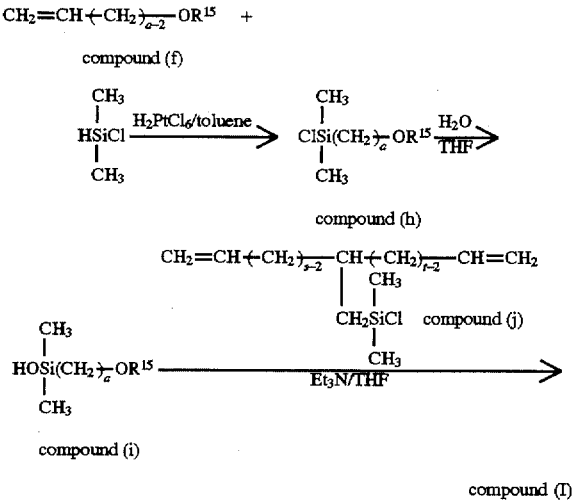

[i] The hydrosilyation of the compound (f) with chlorodimethylsilane is carried out in a solvent in the presence of a catalyst to give a compound (h), [ii] the compound (h) is allowed to react with water to give a compound (i), [iii] the compound (i) is allowed to react with a compound (j) in a solvent in the presence of a proper hydrogen halide acceptor, to give a compound (I).

Some suitable examples of the solvents which may be used in the hydrosilyation in [i] include inert aromatic hydrocarbons, such as benzene, toluene and xylene, inert ether solvents, such as tetrahydrofuran (THF) and diisoproto give the compound (i). When the reaction solution (organic layer) is to be used for the reaction [iii] as it is, dehydration is carried out by using magnesium sulfate, or the like.

The compound (j) is dissolved in an ether inert solvent, such as THF or diethyl ether, or a hydrocarbon inert solvent, such as toluene or hexane, and the solution is added to a solution of the compound (i) obtained in [ii] and purified by a silica gel column or the like dissolved in an ether inert solvent, such as THF or diethyl ether, or to the unpurified reaction solution of the reaction [ii], or to a solution containing the unpurified reaction solution and a ether inert solvent, such as THF or diethyl ether, or a hydrocarbon inert solvent, such as toluene or hexane, to give a solution mixture. A tertiary amine, such as pyridine or triethylamine is added as a hydrogen halide acceptor to the solution mixture, and the mixture is then agitated, to give the compound (I). The reaction is carried out in an atmosphere of an inert gas, such as $N_2$ or Ar, at room temperature. When the reactivity is insufficient, the reaction system may be heated to a temperature of 20 to 80° C.

Step 6

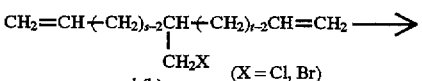

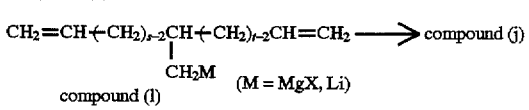

Synthesis of the compound (j)

[i] A compound (k) is allowed to react with magnesium in a solvent to give a compound (l) (M=MgX), or with metallic lithium to give a compound (l) (M=Li). The compound (k) is produced by halogenating a corresponding alcohol, for example, with N-bromosuccinimide.triphenylphosphine, N-chlorosuccinimide.triphenylphosphine or carbon tetrachloride.triphenylphosphine.

[ii] The compound (l) is allowed to react with tetrachlorosilane, and then with double the molar quantity of methyllithium, to give a compound (j). When M=Li, the compound (j) may also be produced by allowing the compound (l) to react with dichlorodimethylsilane.

The suitable solvent for the reactions in [i] and [ii] is an ether inert solvent, such as THF or diethyl ether. The reaction is carried out in an atmosphere of an inert gas, such as nitrogen or argon, at −70° to 80° C.

In [i], iodide, 1,2-dibromoethane or the like may be added to accelerate the reaction.

Some examples of the compounds (k) include 3-chloromethyl-1,4-pentadiene, 3-chloromethyl-1,5-hexadiene, 3-chloromethyl-1,6-heptadiene, 4-chloromethyl-1,6-heptadiene, 3-chloromethyl-1,7-octadiene, 4-chloromethyl-1,7-octadiene, 3-chloromethyl-1,8-nonadiene, 5-chloromethyl-1,8-nonadiene, 4-chloromethyl-1,9-decadiene, 5-chloromethyl-1,9-decadiene, 3-chloromethyl-1,10-undecadiene, 6-chloromethyl-1,10-undecadiene and the corresponding bromomethyl derivatives thereof.

[2] Compounds (IIa) represented by the general formula (IIa)

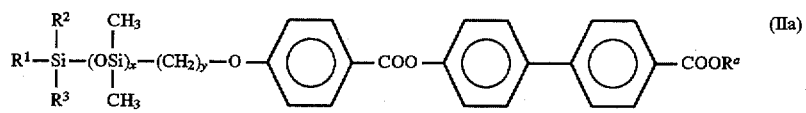

wherein, $R^1$ is an alkyl group of 1 to 20 carbon atoms, $R^2$ and $R^3$ are each independently an alkyl group of 1 to 6 carbon atoms, x is an integer of 1 to 5, y is an integer of 3 to 20 and $R^4$ is an alkyl group of 1 to 10 carbon atoms.

The compounds (IIa) include low molecular weight ferroelectric liquid crystals and low molecular weight non-ferroelectric liquid crystals.

Some preferred examples of the compounds (IIa) include the followings.

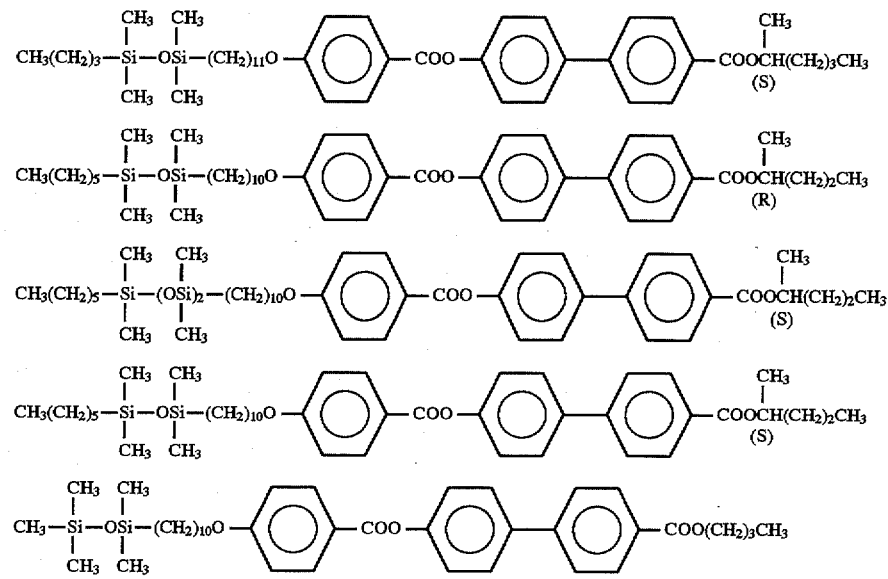

In the general formula (IIa), $R^1$ is an alkyl or 1 to 20 carbon atoms which may be linear or be branched. $R^1$ is preferably an alkyl of 1 to 12 carbon atoms, and other $R^1$ of 13 or more carbon atoms may narrow down the temperature range of smectic C phase or chiral smectic C phase.

The preferred examples of the alkyl groups represented by $R^1$ include methyl, ethyl, propyl, isopropyl, n-butyl, isobutyl, tert-butyl, n-pentyl, 3-methyl-1-butyl, 3-pentyl, neopentyl, n-hexyl, 4-methyl-1-pentyl, 3,3-dimethyl-1-butyl, 2-ethyl-1-butyl, 3-methyl-3-pentyl, n-heptyl, 4-heptyl, 3-ethyl-3-pentyl, n-octyl, n-nonyl, n-decyl, n-undecyl, and n-dodecyl, $R^2$ and $R^3$ are each independently an alkyl group of 1 to 6 carbon atoms, and these groups may be identical or different from $R^1$ and may also be linear or branched. The preferred examples of the groups $R^2$ and $R^3$ include methyl, ethyl, propyl, isopropyl, n-butyl, isobutyl, tert-butyl, n-pentyl, 3-methyl-1-butyl, 3-pentyl, neopentyl, n-hexyl, 4-methyl-1-pentyl, 3,3-dimethyl-1-butyl, 2-ethyl-1-butyl and 3-methyl-3-pentyl.

$R^4$ is an alkyl group of 1 to 10 carbon atoms which may be linear or branched. Also, $R^4$ may be optically active or inactive.

Among the compounds (IIa) that have an optically active alkyl group as $R^4$ are represented by the general formula (IIb)

Herein R and S indicate respectively the absolute configurations of asymmetric carbon atoms.

Some preferred examples of the optically inactive alkyl groups represented by $R^4$ include methyl, ethyl, propyl, isopropyl, n-butyl, isobutyl, tert-butyl, n-pentyl, 3-methyl-1-butyl, 3-pentyl, neopentyl, n-hexyl, 4-methyl-1-pentyl, 3,3-dimethyl-1-butyl, 2-ethyl-1-butyl, 3-methyl-3-pentyl, n-heptyl, 4-heptyl, 3-ethyl-3-pentyl, n-octyl, n-nonyl and n-decyl.

"x" represents an integer of 1 to 5.

"y" represents an integer of 3 to 20. "y" is preferably an integer of 6 to 12, and if it is larger or smaller than the range, the temperature range of smectic C phase or chiral smectic C phase will tend to be narrowed. The particularly preferred range of "y" is 8 to 11.

The compound (IIa) represented by the general formula (IIa) is prepared, for example, as follows.

<Method (A) of Preparing the Compound (IIa)>

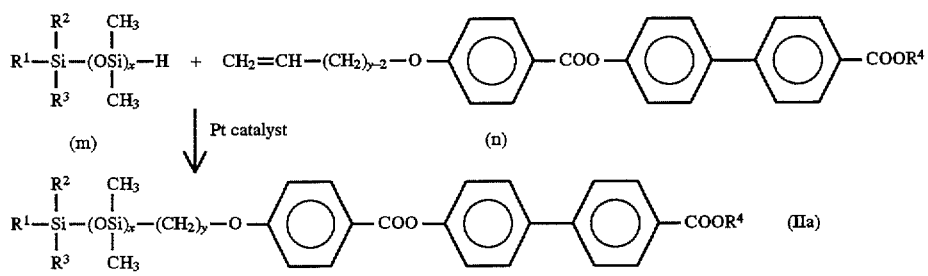

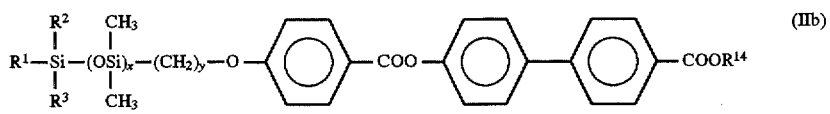

wherein, $R^1$, $R^2$, $R^3$, x and y are as defined above, and $R^{14}$ is an optically active alkyl group of 4 to 10 carbon atoms.

The compounds (IIb) should be ferroelectric liquid crystal compounds when used as above-described (B), but when used as a component of the above-described (C), they are not necessarily liquid-crystalline.

Some suitable examples of the optically active alkyl groups represented by $R^4$ include (R)-1-methylpropyl, (S)-1-methylpropyl, (R)-1-methylbutyl, (S)-1-methylbutyl, (R)-2-methylbutyl, (S)-2-methylbutyl, (R)-1-methylpentyl, (S)-1-methylpentyl, (R)-1-methylhexyl, (S)-1-methylhexyl, (R)-1-methylheptyl and (S)-1-methylheptyl.

As shown in the above reaction formulae, the compound (IIa) can be synthesized easily and in a low cost by carrying out a hydrosilyation between a siloxane compound (m), which is commercially available or can be prepared easily by the method described later, and an olefin compound (n) in a solvent in the presence of a catalyst, such as a platinum catalyst.

The solvent, catalyst, reaction conditions, such as reaction temperature and the manner of adding agents, in this hydrosilyation are the same as those employed in the hydrosilyation of step 5 for the synthesis of the compound (I).

<Method (B) of Preparing the compound (IIa)>

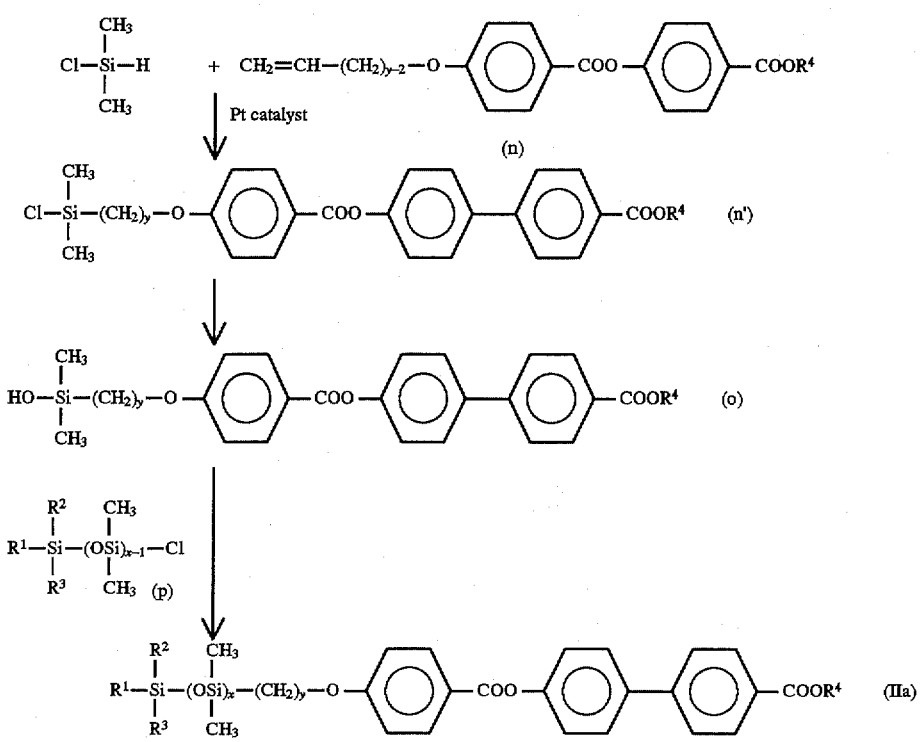

An olefin compound (n) and dimethylchlorosilane are allowed to undergo a hydrosilyation to synthesize a chlorosilane compound (n'), which is then hydrolyzed to give a silanol compound (o). The silanol compound (o) tends to be condensed, and hence should be handled carefully in a neutral state. The silanol compound (o) is then siloxane-bonded with a chlorosilane compound (p) in a solvent in the presence of a tertiary amine as an hydrogen halide acceptor, to give the objective liquid crystal compound (IIa).

The reaction conditions in the hydrosilyation of the olefin compound (n) with dimethylchlorosilane are the same as those described above in the preparation method (A). The chlorosilane compound (n') tends to be hydrolyzed, and hence, without its being separated, the reaction solution it self is used for the next synthesis of the silanol compound (o). Water of an amount equimolar to the chlorosilane compound (n') is dissolved in a solvent compatible with water, such as THF, and the solution is then added to the reaction solution containing the chlorosilane compound (n'). The preferred reaction temperature ranges from 0° to 80° C. A tertiary amine, such as pyridine or triethylamine, is added as a hydrogen halide acceptor. In an alternative method, water not of an equimolar quantity but of an excess may be added to a solvent compatible with water, the reaction solution containing the chlorosilane compound (n') is added thereto, and then water is removed of by a dehydrating agent, such as sodium sulfate or magnesium sulfate. The compound (o) may also be prepared by diluting the reaction solution containing the compound (n') with diethyl ether or the like, adding thereto an aqueous solution of a hydrogen halide acceptor, such as sodium hydroxide, and then agitating.

The suitable solvents which may be used in the reaction between the thus obtained silanol compound (o) and the chlorosilane compound (p) include inert ether solvents, such as THF, inert hydrocarbon solvents, such as toluene and hexane, carbon halide solvents, such as methylene chloride, and other inert solvents, such as dimethylformamide (DMF) and dimethylsulfoxide (DMSO). The preferred tertiary amines include pyridine, triethylamine, ethyldiisopropylamine, 4-dimethylaminopyridine and imidazole. Agents for removing hydrogen halides, such as 1,8-diazabicyclo-[5.4.0]-7-undecene (DBU), are also suitable. The reaction is carried out in an atmosphere of an inert gas, such as nitrogen or argon, at a temperature ranging from 0° C. to room temperature. When the reactivity is insufficient, the reaction system may be heated to a temperature of 20° to 80° C.

The preferred chlorosilane compounds (p) include trimethylchlorosilane, triethylchlorosilane, n-butyldimethylchlorosilane, tert-butyldimethylchlorosilane, di-n-butylmethylchlorosilane and tri-n-butylchlorosilane.

For example, the siloxane compound (m) and the olefin compound (n) are prepared as follows.

<Method of Preparing the Siloxane compound (m)>

Other than commercially available ones, such as pentamethyldisiloxane, siloxane compounds (m) prepared by the following method also may be used.

(i) Siloxane compounds (m) wherein x=1:

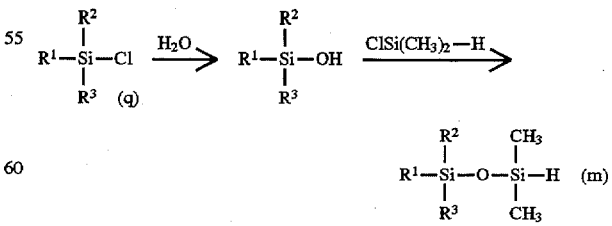

As shown in the above reaction formula, a trialkylchlorosilane (q) is hydrolyzed to give a silanol compound, which is then allowed to react with dimethylchlorosilane, to give the disiloxane compound (m). The reaction conditions of the hydrolysis and the siloxane bonding reaction are the same as those described in the above preparation method (B).

The suitable examples of the trialkylchlorosilanes (q) include trimethylchlorosilane, triethylchlorosilane, n-butyldimethylchlorosilane, tert-butyldimethylchlorosilane, di-n-butylmethylchlorosilane and tri-n-butylchlorosilane.

(ii) Siloxane compounds (m) wherein $R^1$ is an alkyl group of 3 or more carbon atoms and $R^2=R^3=CH_3$

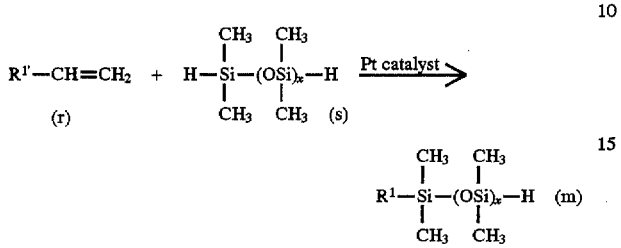

($R^{1'}$—CH=CH$_2$ is an olefin having one carbon-carbon double bond at an end, and its hydrogen atoms is less than that of the corresponding alkane by two.)

As shown by the above reaction formula, the siloxane compounds (m) are prepared by the hydrosilyation of various olefins (r) and the siloxane compounds (s)). The conditions of the hydrosilyation are the same as those described above.

Suitable examples of the olefins (r) include 1-hexene, 1-octene, 1-decene, 1-undecene, 4-methyl-1-pentene and 3,3-dimethyl-1-butene. Suitable examples of the siloxane compounds (s) include 1,1,3,3-tetramethyldisiloxane, 1,1,3,3,5,5-hexamethyltrisiloxane and 1,1,3,3,5,5,7,7-octamethyltetrasiloxane.

<Method of Preparing the Olefin Compound (n)>

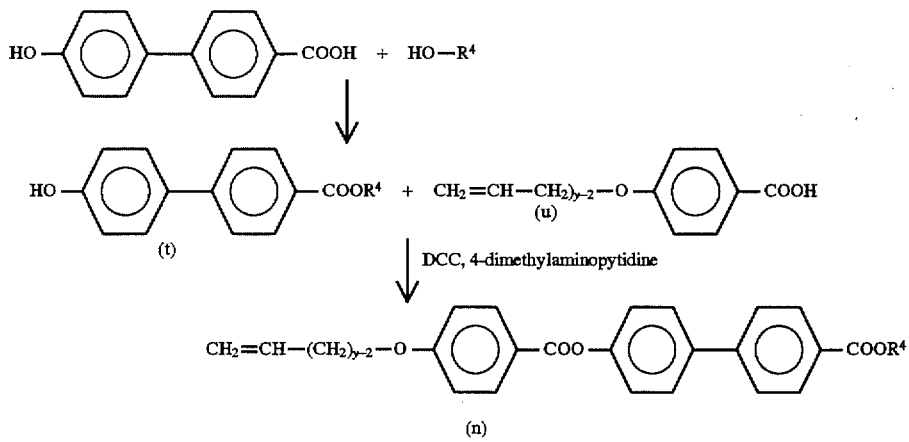

As shown in the above reaction formula, an ester (t) is prepared by a known esterification, and the ester (t) is esterified with a carboxylic acid (u), to give the olefin compound (n).

[3] The Compound (III) which is represented by the general formula (III) and have smectic C phase

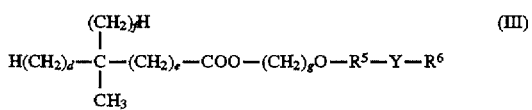

wherein, $R^5$ is (structures shown)

$R^6$ is an optically inactive alkyl group of 4 to 20 carbon atoms, d is an integer of 0 to 10, e is an integer of 0 to 10, f is an integer of 1 to 10, g is an integer of 1 to 20, and Y is a single bond, —O—, —COO— or —OCO—.

The compounds (III) are non-ferroelectric low molecular weight liquid crystals.

Some examples of the branched alkyl groups located at an end of each optically inactive compound (III) include the followings.
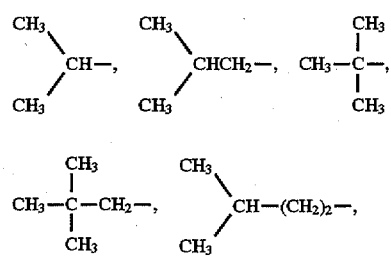
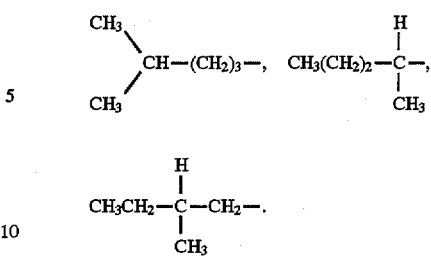
Typical examples of the compounds (III) include the following compounds.
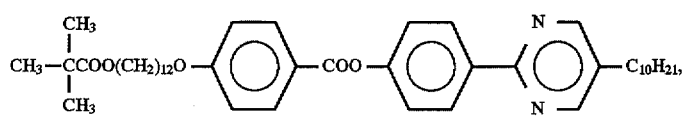 (1)
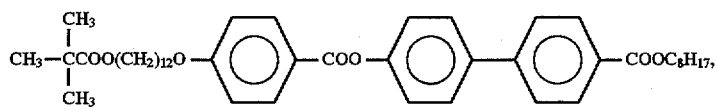 (2)
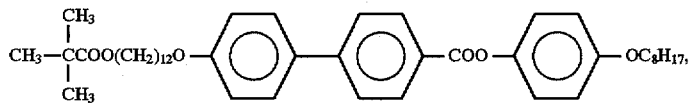 (3)
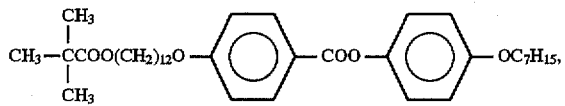 (4)
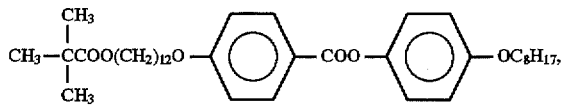 (5)
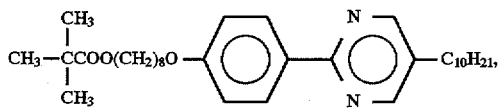 (6)
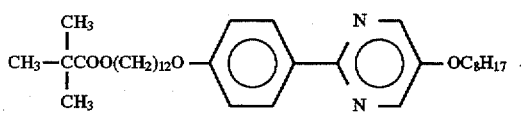 (7)
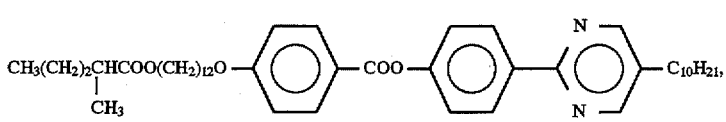 (8)
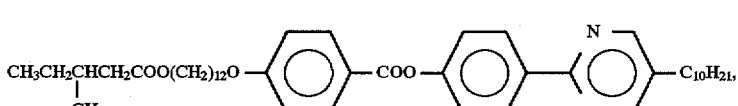 (9)
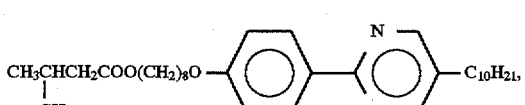 (10)

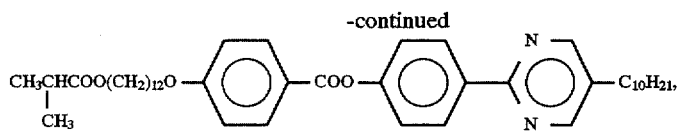
(11)

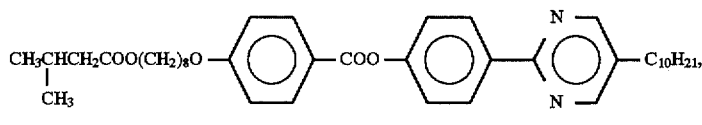
(12)

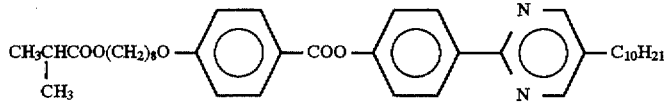
(13)

[4] The compound having smectic C phase selected from the group consisting of the compounds represented by the general formulae (IV) to (VII)

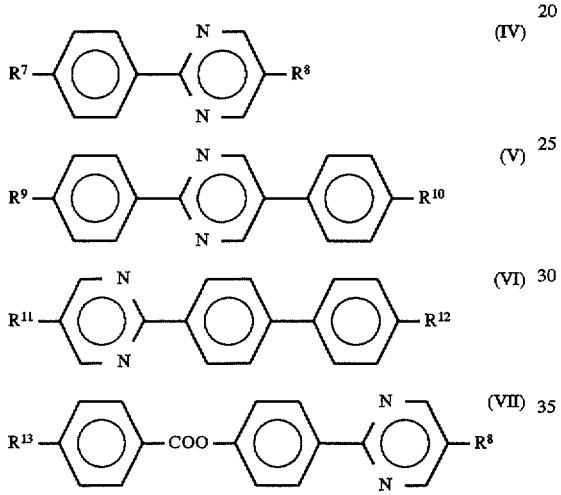

wherein, $R^7$ is an optically inactive alkyl, alkoxyl, alkoxycarbonyl or acyloxy group of 6 to 15 carbon atoms, $R^8$ is an optically inactive alkyl or alkoxyl group of 6 to 12 carbon atoms, $R^9$ and $R^{10}$ are each independently an optically inactive alkyl or alkoxyl group of 4 to 14 carbon atoms, $R^{11}$ is an optically inactive alkyl group of 4 to 14 carbon atoms, $R^{12}$ is an optically inactive alkyl or alkoxyl group of 4 to 14 carbon atoms, and $R^{13}$ is an optically inactive alkyl or alkoxyl group of 6 to 20 carbon atoms.

These compounds are low molecular weight non-ferroelectric liquid crystals.

The groups represented by $R^7$ to $R^{13}$ may be linear or branched.

Typical examples of these compounds include the following compounds.

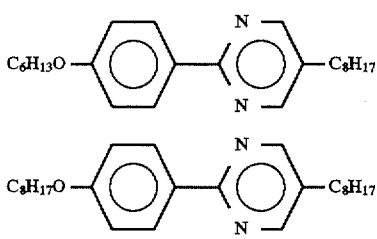

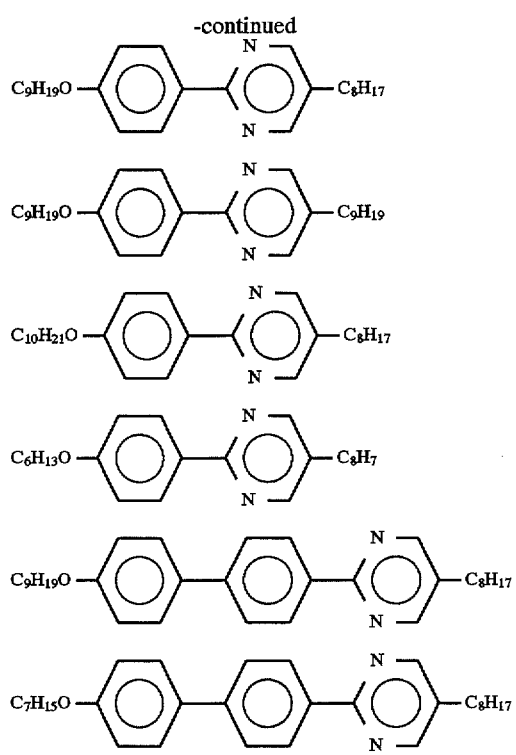

MOST-SLOWLY-RESPONDING LIQUID CRYSTAL PHASE

The main component of the most-slowly-responding liquid crystal phase may be any one, so far as it can be separated from the most-quickly-responding liquid crystal phase and forms a liquid crystal phase whose response time is more than 50 times that of the most-quickly-responding liquid crystal phase. As described as to the liquid crystal display device of the present invention, to equalize the alignment directions of the most-slowly-responding liquid crystal phase to that of the most-quickly-responding liquid crystal phase in the liquid crystal display device of the present invention, it is preferable that both the most-slowly-responding liquid crystal phase and the most-quickly-responding liquid crystal phase have a ferroelectric phase within a temperature range. To endow the liquid crystal composition with excellent alignment properties, high orientation stability and impact resistance, it is also preferable to use a liquid-crystalline polymer material. The preferred liquid crystal materials for the most-slowly-responding liquid crystal phase are ferroelectric liquid-crystalline polymers and ferroelectric liquid-crystalline polymer compositions. From the viewpoint of separation from the most-quickly-responding liquid crystal phase, the particularly preferred are polysiloxane-type ferroelectric liquid-crystalline polymers.

Some examples of the polysiloxane-type ferroelectric liquid-crystalline polymers include the ferroelectric liquid-crystalline polymers (VIII) having repeating units represented by the general formula (VIII)

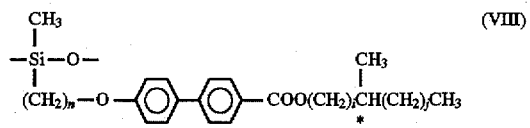

wherein, h is an integer of 8 to 10, i is 1 or 2, j is 1 or 2, and * indicates an asymmetric carbon atom.

The preferred end group for the main chain of the ferroelectric liquid-crystalline polymer (VIII) is trimethylsilyl [that is, the structures of both ends are $(CH_3)_3SiO$—].

Typical examples of the ferroelectric liquid-crystalline polymers (VIII) include the followings.

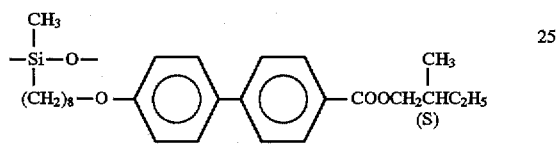

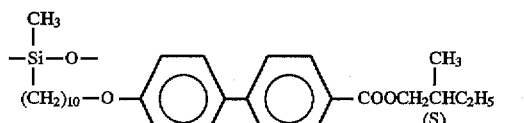

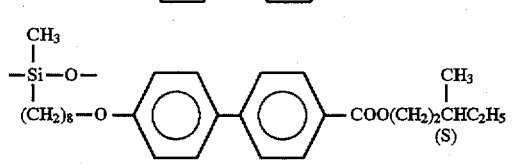

In place of the ferroelectric liquid-crystalline polymers, liquid-crystalline polymers, such as chiral nematic liquid crystals and smectic C liquid crystals, may also be used.

Typical examples of the chiral nematic liquid crystals include those having the following repeating unit.

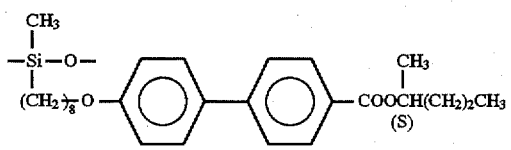

Typical examples of the smectic C liquid crystals include those having the following repeating unit.

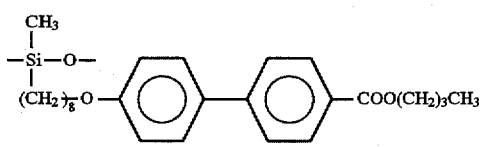

The weight average molecular weight of the liquid-crystalline polymers preferably ranges from 2,000 to 200,000. If it is less than 2,000, the phase separation of the most-slowly-responding liquid crystal phase from the most-quickly-responding liquid crystal phase may be insufficient, and if it is more than 200,000, alignment treatment may be difficult.

The preferred liquid crystal compositions which can be separated into two liquid crystal phases comprise the following most-quickly-responding liquid crystal phase (1) and the following most-slowly-responding liquid crystal phase (2):

(1) a most-quickly-responding liquid crystal phase which contains a main component comprising at least one selected from the group consisting of the specific compounds (I') represented by the general formula (I) wherein s=t=3, a=10 or 11, b=o and c=2 to 4, and the specific compounds (IIb') represented by the general formula (IIb) wherein $R^1$ is a linear alkyl group of 4 to 8 carbon atoms, $R^2=R^3=CH_3$, x=1, y=10 or 11, $R^{14}$ is (S)-1-methylbutyl, (R)-1-methylbutyl, (S)-1-methylpentyl, (R)-1-methylpentyl, (S)-1-methylhexyl or (R)-1-methylhexyl;

at least one selected from the group consisting of the compounds (III') having smectic C phase and represented by the general formula (III) wherein d=0, e=1, f=1, g=6 to 10, $R^5$ is

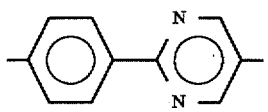

$R^6$ is a linear alkyl group of 8 to 12 carbon atoms, and Y is a single bond or —O—;

at least two compounds selected from the compounds (IV') having smectic C phase and represented by the general formula (IV) wherein $R^7$ and $R^8$ are each independently a linear alkyl or alkoxyl group of 6 to 12 carbon atoms; and, optionally, at least one compounds (IIa') represented by the general formula (IIa) wherein $R^1$ is a linear alkyl group of 1 to 8 carbon atoms, $R^2=R^3=CH_3$, x=1, y=8 to 11, and $R^4$ is n-propyl, n-butyl or n-pentyl.

(2) A most-slowly-responding liquid crystal phase containing as a main component at least one ferroelectric liquid-crystalline polymer (VIII).

Typical examples of the preferred liquid crystal compositions are those employed in Examples 1 to 5 and 8 in this specification. In Examples 1 to 5 and 8, the low molecular weight ferroelectric liquid crystal A is a member of the compounds (I'), the low molecular weight ferroelectric liquid crystals F and M are members of the compounds (IIb'), the low molecular weight liquid crystal C is a member of the compounds (III') having smectic C phase, the low molecular weight liquid crystals D, E and I are members of the compounds (IV') having smectic C phase, the low molecular weight liquid crystal G is a member of the compounds (IIa'), and the ferroelectric liquid-crystalline polymers B, H, J and N are members of the liquid-crystalline polymers (VIII).

Concerning the percentages of the ingredients contained in the preferred liquid crystal compositions, in addition to the specific percentages employed in Examples 1 to 5 and 8, such percentages that the total percentage of the liquid crystals constituting the most-slowly-responding liquid crystal phase ranges from 6 to 27% by weight based on the total weight of each liquid crystal composition, and the total of the compounds (I')+(IIb')+(IIa') ranges from 50 to 70% by weight based on the total of the compounds (I'), (IIb'), (III'), (IV') and (IIa').

As another liquid-crystalline polymer component than the liquid-crystalline polymers which is the main component of the most-slowly-responding liquid crystal phase, the liquid crystal composition of the present invention may further contain a secondary liquid-crystalline polymer which is more compatible with the most-quickly-responding liquid crystal phase than with the most-slowly-responding liquid crystal phase so as to be an ingredient of the most-quickly-responding liquid crystal phase, so long as the presence thereof does not obstruct significantly the quick response of the most-quickly-responding liquid crystal phase to electric field. This further improves the liquid crystal display device of the present invention in alignment stability and impact resistance. The amounts of such liquid-crystalline polymers depend on the quick response required of the liquid crystal display device, and the preferred amount is 1 to 5% by weight based on the total weight of the liquid crystal composition. If it is less than 1% by weight, the improvement in alignment stability and impact resistance will be insufficient, and if it is more than 5% by weight, the response speed of the most-quickly-responding liquid crystal phase will be lowered considerably.

From the viewpoint of electric field response properties, the secondary liquid-crystalline polymer is a ferroelectric liquid-crystalline polymer. Typical examples of such ferroelectric liquid-crystalline polymers are ferroelectric liquid-crystalline polymers (IX) having the repeating units represented by the general formula (IX) and disclosed in the specification of International Publication No. 92/01731):

When a solution mixing is employed, it is conducted, for example, as follows.
(1) Predetermined quantities of the ingredients of the liquid crystal composition are dissolved in a solvent, such as dichloromethane or 2-butanone.
(2) The solvent is removed off by heating, to give a liquid crystal composition.
(3) Thermoplastic amorphous polymers, such as polystyrene, or spacers may be added, so far as the properties of the liquid crystal composition, such as alignment properties, are not deteriorated.

2. The liquid crystal composition is disposed between two substrates bearing on their surfaces facing each other their respective electrode structures (at lease one substrate is transparent), to form a liquid crystal layer of a predetermined thickness, generally 1.5 to 3 µm.

The liquid crystal layer is suitably formed by applying or printing the liquid crystal composition on at least one of the substrates. When the viscosity of the liquid crystal composition is too high to conduct application or printing, it is preferable to apply or print the liquid crystal composition in a state diluted with dichloromethane, 2-butanone or the like, or in a state heated to isotropic phase. Also, the solution which prepared in the course of the preparation of the liquid crystal composition and is not yet heated to remove the solvent may also be used for the application or printing. When solvents are used, the solvents are removed off by heating after the application or printing.

The substrates are not particularly limited, so far as at least one is made of a transparent material. The examples of

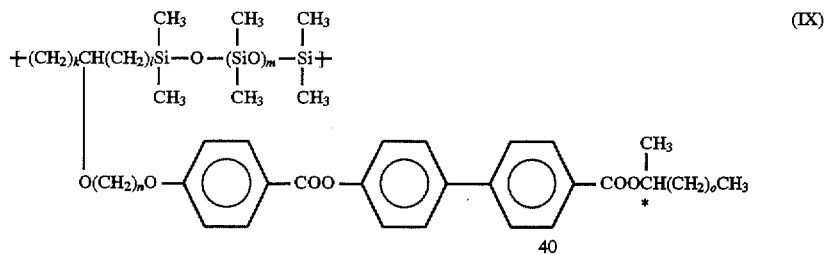

wherein k and l are each independently an integer of 2 to 5, m is an integer of 0 to 3, n is an integer of 8 to 12, o is an integer of 1 to 4, and * indicates an asymmetric carbon atom.

A suitable example of the ferroelectric liquid-crystalline polymers (IX) is the following one.

transparent materials include glass, polyethyleneterephthalates (PET), polyethersulfones (PES) and polycarbonates (PC). When the liquid crystal composition contains liquid-crystalline polymers, flexible substrates, such as those of plastic film, are preferable to improve the productivity. The thickness of the substrates are preferably 10 µm to 5 mm.

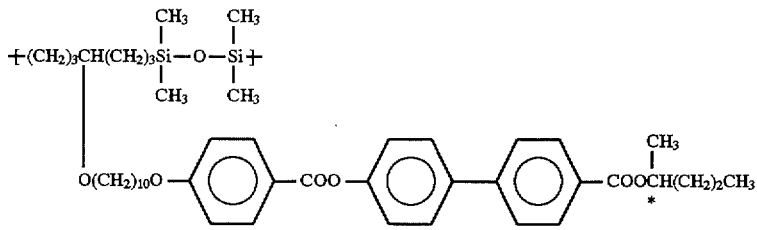

(weight average molecular weight: 2000–8000)

Production of Liquid Crystal Display Device

For example, the liquid crystal display device of the present invention may be produced as follows.

1. First a liquid crystal composition is prepared. The mixing method for preparing the liquid crystal composition is not limited, and may be a solution mixing using a solvent or may be a direct mixing using no solvents.

The electrode structures are not particularly limited, so far as ones of transparent materials are provided on transparent substrates. It is preferable to form by vapor deposition on a substrate a transparent electrode structure, such as indium oxide or ITO comprising a mixture of indium oxide and tin oxide.

3. The device thus constructed is heated to transfer the whole liquid crystal composition to isotropic phase, and then cooled to separate the liquid crystal phases from each other.

The heating is not essential but makes a phase separation of a suitable state.

The alignment treatment by the shearing method described later may be conducted during the cooling stage before the temperature returned to room temperature.

4. The alignment of the liquid crystal phases may be conducted by using any known method, for example, a method using orientation control layers or a shearing method. When orientation control layers are used, polymer layers, such as polyimide or polyvinylalcohol layers, are disposed between the liquid crystal layer and the electrode structures on the substrate. Some examples of shearing methods include a method of slightly reciprocating the opposing substrates in directions opposite and parallel to each other, a method of bending the device, and a method of applying a shearing force in such manners as described above while an electric field is applied between the substrates.

When a shearing method is employed, on one hand the shearing force accelerates the phase separation, on the other hand the agglomeration of the most-slowly-responding liquid crystal phase proceeds, to form a separated phase which constitutes pillars and is hence different from the polymer phase, such as liquid-crystalline polymer phase formed by the alignment method disclosed in Japanese Patent Application Kokai Koho (laid-open) No. 4-281425 using alignment control layers and containing the polymers dispersed at intervals of about 1 to 2 μm.

The shearing methods, preferably the method of applying a shearing force in such manners as described above while an electric field is applied between the substrates, easily make the alignment state wherein when all the liquid crystal phases have layer structures having layer normal lines, the layer normal lines are directed substantially in one direction, when none of the liquid crystal phases have a layer structure, all the liquid crystal phases are aligned substantially in one direction, or, when one or more of the liquid crystal phases have layer structures having layer normal lines and one or more other liquid crystal phases have no layer structure, the layer normal lines of the former liquid crystal phases and the alignment of the latter liquid crystal phases are directed substantially in one direction.

Concerning the state of phase separation, when there are only two liquid crystal phases, the most-slowly-responding liquid crystal phase forms "islands" in the "sea" of the most-quickly-responding liquid crystal phase, and each island of the most-slowly-responding liquid crystal phase desirably has an average area of 4 to 500 μm², preferably 6 to 100 μm². Herein the average area is calculated by observing displayed pictures. Islands of areas of less than 2 μm², if ever, cannot be distinguished from noise, and hence are not included in the calculation.

The islands of the most-slowly-responding liquid crystal phase at least partially form pillars between the substrates, to improve the alignment stability and impact resistance.

Hereinafter the present invention will be described in more detail referring to Examples, which however do not limit the scope of the present invention.

In formulae representing phase transfer behaviors, Iso means isotropic phase, $S_A$ means smectic A phase, $S_C$ means smectic C phase, $S_C^*$ means chiral smectic C phase, N* means chiral nematic phase, and glass means glass state.

EXAMPLES 1 TO 8 AND COMPARATIVE EXAMPLE 1

Example 1

The following liquid crystal materials in quantities of 120 mg of A, 50 mg of B, 40 mg of C, 20 mg of D and 20 mg of E are dissolved in 2 ml of dichloromethane. After these are confirmed to be homogeneously dissolved, the solution was heated to remove the solvent, to give the following liquid crystal composition.

low molecular weight ferroelectric liquid crystal A: 48 wt %

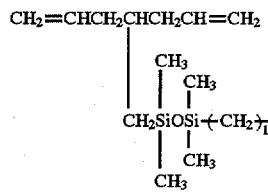
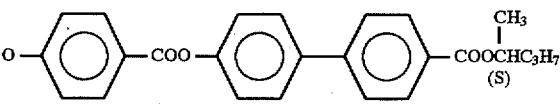

ferroelectric liquid-crystalline polymer B: 20 wt %

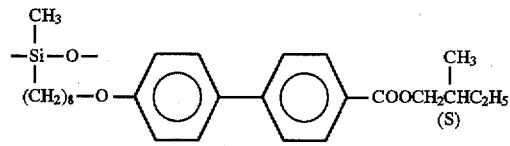

(both end groups of main chain: trimethylsilyl)
(Mw = 13000)

low molecular weight liquid crystal C: 16 wt %

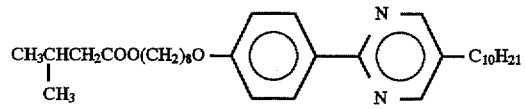

low molecular weight liquid crystal D: 8 wt %

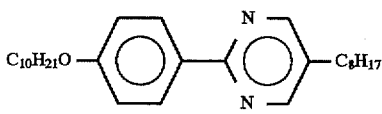

low molecular weight liquid crystal E: 8 wt %

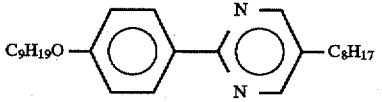

Silica spacers of 3 μm in diameter were spread down from a micro spartel on a glass substrate (thickness 1 mm, 20 mm□) bearing a transparent electrode structure (ITO, 10 mm□), and the liquid crystal composition prepared as above was subsequently applied on the substrates by using a micro spartel and then heated to 100° C. According to visual observation, the liquid crystal composition had been transferred to isotropic phase. Another glass substrate with the same transparent electrode structure was pressed to the layer of the liquid crystal composition, to form a cell with a liquid crystal layer of 3 μm thick.

Figure 3:
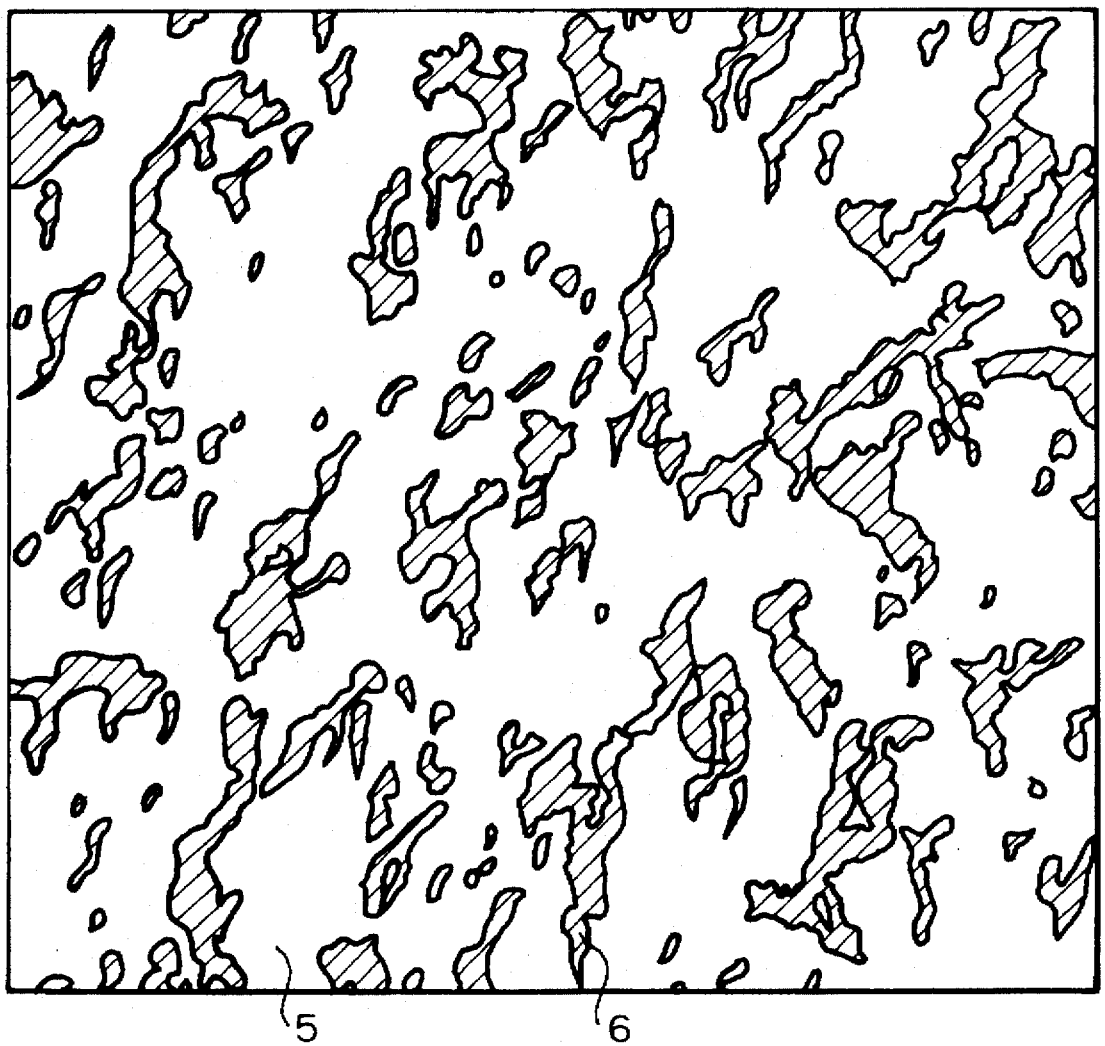
FIG. 3 is a schematic plan view showing a liquid crystal composition separated into two phases in the liquid crystal display device of the present invention.

The cell was cooled at a rate of about 3° C./min, and in the course of cooling from 75° C. to 63° C., the liquid crystals are aligned by applying shear between the substrates while a triangle wave of 10 Hz and ±10 V was applied between the electrode structures, to give a liquid crystal display device (1) (alignment procedure 1). According to observation with a polarized microscope, the liquid crystal composition had been separated into two phases as shown in FIG. 3, one liquid crystal phase 5 comprising as a main component consisting of low molecular weight liquid crystals and one liquid crystal phase 6 forming islands and comprising as a main component consisting of a liquid-crystalline polymer.

The aligned cell was disposed between crossed Nicols, and a rectangular wave as shown in FIG. 4(a) (30 V) was applied between the transparent electrode structures by using a wave generator. According to the measurement of the intensity of transmittance from the output voltage of a photo-diode, the intensity of transmittance was changed as shown in FIG. 4(b).

An aligned liquid crystal display device (2) was produced by repeating the above-described procedure except that 120 mg of A, 40 mg of C, 20 mg of D and 20 mg of E were used as the liquid crystal materials (in the same weight ratios of A, C, D and E as those used in the liquid crystal display device (1)) and the electric field for alignment was applied in the course of cooling from 67° C. to 62° C. When the same rectangular wave as shown in FIG. 4(a) was applied in the same manner as that described above and the intensity of transmittance was measured, the intensity of transmittance was changed as shown in FIG. 5(a).

An aligned liquid crystal display device (3) was produced by repeating the above-described procedure except that only B was used as the liquid crystal material and the electric field for alignment was applied in the course of cooling from 75° C. to 67° C. When the same rectangular wave as shown in FIG. 4(a) was applied in the same manner as that described above and the intensity of transmittance was measured, the intensity of transmittance was changed as shown in FIG. 5(b).

The comparison among FIG. 4(b), FIG. 5(a) and FIG. 5(b) indicates that the domain that showed quick response in FIG. 4(b) (the rapid decrease of the intensity of transmittance after the inversion of the direction of the applied electric field) is a liquid crystal phase whose main component consists of the low molecular weight liquid crystals A, C, D and E, and the domain that showed slow response in FIG. 4(b) (the slow increase of the intensity of transmittance in seconds) is a liquid crystal phase whose main component consists of the ferroelectric liquid-crystalline polymer B.

Figure 6A:
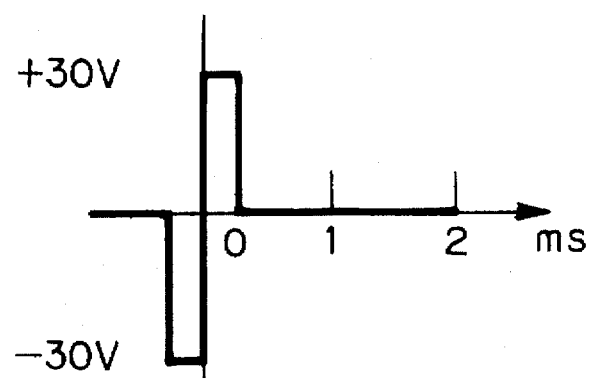
FIG. 6(a) and FIG. 6(b) are graphical illustration of the relationship between voltages as shown in FIG. 6(a) applied to a liquid crystal display device and the values of the transmittance as shown in FIG. 6(b).
Figure 6B:
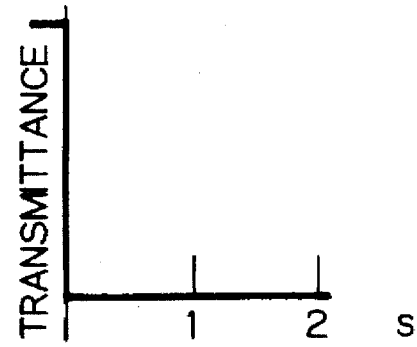

When a pulse voltage (30 V, 250 μs) as shown in FIG. 6(a) was applied to the cell of the liquid crystal display device (1), the intensity of transmittance was changed as shown in FIG. 6(b). The absence of the slow change of the intensity of transmittance in seconds as shown in FIG. 4(b) indicates that only the quickly responding liquid crystal phase responded to the pulse voltage with a short pulse duration.

When a pulse voltage (30 V, 15 ms) of the same form as shown in FIG. 6(a) was applied to the liquid crystal display device (1), the liquid crystal phase with the narrower occupation area did not responded. This shows that the response time of the quickly responding liquid crystal phase is less than 1/50 times as long as that of the slowly responding liquid crystal phase.

When the pulse voltage as shown in FIG. 6(a) was applied to the cell after a rubber ball of 10 mm in diameter was dropped thereon from a height of 30 cm, the same changes of the intensity of transmittance as that of FIG. 6(b) was observed, resulting in the confirmation that there occurred no change in the alignment of the liquid crystals. The contrast ratio of the cell (herein, "contrast ratio" means the ratio of the intensity of transmitted visible light in light state to that in dark state) was 30.

All the measurements of the changes of the intensity of transmittance were carried out at 25° C.

After it was confirmed that the application of the pulse voltage as shown in FIG. 4(a) caused the same changes of the intensity of transmittance as shown in FIG. 4(b), the cell was cooled to −10° C. and then heated to 25° C. When applied the voltage as shown in FIG. 4(a), it showed the same response as shown in FIG. 6(b). From comparison with FIG. 4(b), it was confirmed that the domain which had responded slowly no longer responded. The contrast ratio of the cell was 29.

The phase transfer behavior of the liquid crystal composition in each liquid crystal phase of the cell, the response time (the time taken by the intensity of transmittance to change from 10% to 90%, $t_{10-90}$) to electric field taken by the cell after cooling to −10° C. followed by heating to 25° C., and tilt angle are shown bellow.

liquid crystal composition whose main component consists of the low molecular weight liquid crystals A, C, D and E-Iso-(69° C.)→Sc*-(49° C.)→glass liquid crystal composition whose main component consists of the ferroelectric liquid-crystalline polymer B-Iso-(77° C.)→Sc*

$t_{10-90}$=48 μs (25° C., 1 kHz, ±30 V)

Tilt angle 2θ=58° (25° C.)

($t_{10-90}$ at 0° C.)/($t_{10-90}$ at 40° C.)=12 (±30 V)

A liquid crystal display device was produced again by repeating the procedures employed for the production of the liquid crystal display device (1) from the starting procedure to the alignment procedure. The liquid crystal display device was cooled to −10° C. while a direct voltage of 30 V was applied thereto, and was then heated to 25° C. When a voltage as shown in FIG. 4(a) was applied to the liquid crystal display device at 25° C., there was not observed the response as shown in FIG. 4(b) but observed the response as shown in FIG. 6(b). This indicates that the liquid crystal composition whose main component was the ferroelectric liquid-crystalline polymer B had been transferred to a high-order phase, and no longer responded to electric field. The contrast ratio of the cell was 48.

This shows that contrast can be improved by substantially equalize the alignment direction of the slowly responding liquid crystal phase to one of the two alignment directions of the quickly responding liquid crystal phase.

Comparative Example 1

As described in Example 1, when applied the rectangular wave as shown in FIG. 4(a) the liquid crystal display device (2) that contained the liquid crystal materials A, C, D and E exhibited the changes of the intensity of transmittance as shown in FIG. 5(a). When a rubber ball of 10 mm in diameter was dropped on the liquid crystal cell from a height of 30 cm and a rectangular wave as shown in FIG. 4(a) was then applied thereto, the changes of the intensity of transmittance was moderated, resulting in a contrast ratio of 3. That is, it was confirmed that the alignment was disordered.

Example 2

Figure 7:
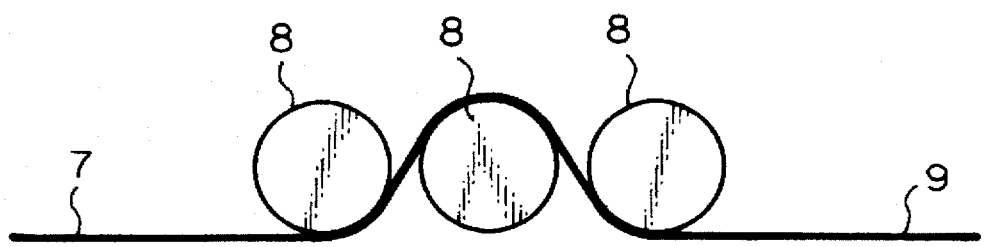
FIG. 7 is a view illustrating a method of orienting a liquid crystal display device.

1.44 g of A, 0.60 g of B, 0.48 g of C, 0.24 g of D and 0.24 g of E, which are the liquid crystal materials as used in Example 1 and whose ratios are the same as those of A, B, C, D and E used in the liquid crystal display device (1), were dissolved in 2-butanone to form a 30% by weight concentration solution, and 3 mg of silica spacers of 2.1 μm in diameter were added thereto. The obtained liquid crystal solution was applied by using a micro gravure coater on a PES substrate (thickness: 100 μm, width: 150 mm) bearing a transparent electrode structure (ITO). After the solvent was dried by heating at 60° C., another PES substrate with a transparent electrode structure was laminated on the liquid crystal layer. The resulting unoriented liquid crystal display device was allowed to stand for 30 minutes at 85° C., and was then subjected to an alignment treatment as shown in FIG. 7. That is, while being applied with a rectangular wave of 10 Hz and ±40 V at 64° C., the unoriented liquid crystal display device 7 was bent by passing it through three rolls 8 each of 40 mm in diameter, to align the liquid crystals and to obtain an oriented liquid crystal display device 9.

According to observation of the oriented liquid crystal display device with a polarized microscope, two kinds of liquid crystal phases were observed. When a pulse voltage of 30 V and 200 μs having the same wave form as that as shown in FIG. 6(a) (see Example 1) was applied at 25° C. to observe the state of the liquid crystal cell before and after the application of the wave, the liquid crystal phase having the smaller occupation area (corresponds to the islands shown in FIG. 3 as described in Example 1) was not switched between light and dark, namely did not respond to electric field. On the other hand the liquid crystal phase having the larger occupation area (corresponds to the sea shown in FIG. 3 as described in Example 1) was switched between light and dark, namely responded to electric field. At that time, the intensity of transmittance was changed in the same manner as that shown in FIG. 6(b) in Example 1. When a pulse voltage of 30 V and 10 ms having the same form as that shown in FIG. 6(a) was applied to the liquid crystal display device, the liquid crystal display phase having the smaller occupation area did not responded.

Example 3

A liquid crystal display device containing a liquid crystal composition having the following composition (the liquid crystal materials used in Example 1 for the production of the liquid crystal display device (1) were replaced by 135 mg of F, 25 mg of B, 45 mg of C, 23 mg of D and 23 mg of E) was produced in the same manner as that employed for the production of the liquid crystal display device (1) of Example 1, except that the simultaneous application of a voltage and shear between the substrates (alignment procedure 1) was carried out at temperatures cooling from 78° C. to 70° C.

low molecular weight ferroelectric liquid crystal F: 54 wt % ferroelectric liquid-crystalline polymer B: 10 wt %
low molecular weight liquid crystal C: 18 wt % low molecular weight liquid crystal D: 9 wt % low molecular weight liquid crystal E: 9 wt %

According to observation of the liquid crystal display device with a polarized microscope, two kinds of liquid crystal phases were observed. When a pulse voltage of 30 V and 200 μs having the same wave form as that as shown in FIG. 6(a) at 25° C. to observe the state of the liquid crystal cell before and after the application of the wave, the liquid crystal phase having the smaller occupation area (corresponds to the islands shown in FIG. 3 as described in Example 1) was not switched between light and dark, namely did not respond to electric field. On the other hand the liquid crystal phase having the larger occupation area (corresponds to the sea shown in FIG. 3 as described in Example 1) was switched between light and dark, namely responded to electric field. At that time, the intensity of transmittance was changed in the same manner as that shown in FIG. 6(b) in Example 1. This shows that only one of the two kinds of liquid crystal phase responded to electric field. When a pulse voltage of 30 V and 10 ms having the same form as that shown in FIG. 6(a) was applied to the liquid crystal display device, the liquid crystal display phase having the smaller occupation area did not respond.

The phase transfer behavior of the liquid crystal composition in each liquid crystal phase of the cell, the electric field response time (the time taken by the intensity of transmittance to change from 10% to 90%, $t_{10-90}$) of the cell and tilt angle are shown bellow.

liquid crystal composition whose main component consists of the low molecular weight liquid crystals F, C, D and E-Iso-(76° C.)→Sc*-(48° C.)→glass liquid crystal composition whose main component consists of the ferroelectric liquid-crystalline polymer B-Iso-(79° C.)→Sc*

$t_{10-90}$=30 μs (25° C., 1 kHz, ±30 V)

Tilt angle 2θ=57° (25° C.)

($t_{10-90}$ at 0° C.)/($t_{10-90}$ at 40° C.)=13 (±30 V)

Example 4

A liquid crystal display device containing a liquid crystal composition having the following composition was produced in the same manner as that employed for the production of the liquid crystal display device (1) of Example 1, except that, as liquid crystal materials, 75 mg of A, 15 mg of G, 50 mg of H, 30 mg of C, 15 mg of E and 15 mg of I were used and the simultaneous application of a voltage and shear between the substrates (alignment procedure 1) was carried out at temperatures cooling from 76° C. to 71° C.

low molecular weight ferroelectric liquid crystal A: 37.5 wt %

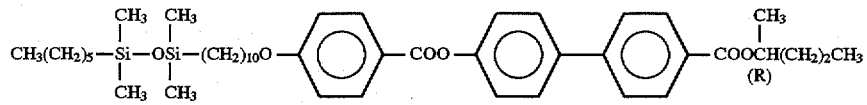

ferroelectric liquid-crystalline polymer H: 25 wt %

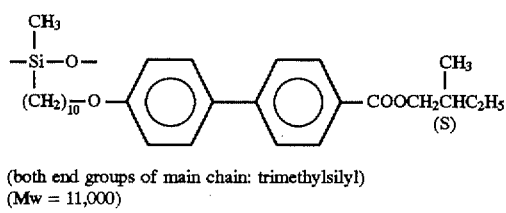

(both end groups of main chain: trimethylsilyl)
(Mw = 11,000)

low molecular weight liquid crystal G: 7.5 wt %

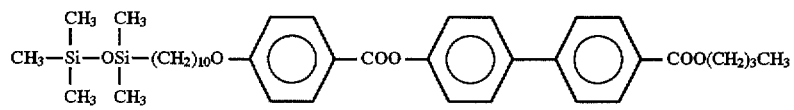

low molecular weight liquid crystal C: 15 wt %
low molecular weight liquid crystal E: 7.5 wt %
low molecular weight liquid crystal I: 7.5 wt %

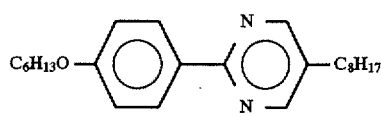

According to observation of the liquid crystal display device with a polarized microscope, two kinds of liquid crystal phases were observed. When a pulse voltage of 30 V and 200 μs having the same wave form as that as shown in FIG. 6(a) at 25° C. to observe the state of the liquid crystal cell before and after the application of the wave, the liquid crystal phase having the smaller occupation area (corresponds to the islands shown in FIG. 3 as described in Example 1) was not switched between light and dark, namely did not respond to electric field. On the other hand the liquid crystal phase having the larger occupation area (corresponds to the sea shown in FIG. 3 as described in Example 1) was switched between light and dark, namely responded to electric field. At that time, the intensity of transmittance was changed in the same manner as that shown in FIG. 6(b) in Example 1. This shows that only one of the two kinds of liquid crystal phase responded to electric field. When a pulse voltage of 30 V and 10 ms having the same form as that shown in FIG. 6(a) was applied to the liquid crystal display device, the liquid crystal display phase having the smaller occupation area did not responded.

The phase transfer behavior of the liquid crystal composition-in each liquid crystal phase of the cell, the electric field response time (the time taken by the intensity of transmittance to change from 10% to 90%, $t_{10-90}$) of the cell and tilt angle are shown bellow.

liquid crystal composition whose main component consists of the low molecular weight liquid crystals A, G, C, E and I-Iso-(77° C.)→Sc*-(−48° C.)→glass liquid crystal composition whose main component consists of the ferroelectric liquid-crystalline polymer H-Iso-(78° C.)→Sc*

$t_{10-90}$=58 μs (25° C., 1 kHz, +30 V)

Tilt angle 2θ=52° (25° C.)

($t_{10-90}$ at 0° C.)/($t_{10-90}$ at 40° C.)=15 (±30 V)

Example 5

A liquid crystal display device containing a liquid crystal composition having the following composition was produced in the same manner as that employed for the production of the liquid crystal display device (1) of Example 1, except that, as liquid crystal materials, 132 mg of A, 60 mg of J, 54 mg of C, 27 mg of D and 27 mg of E were used and the simultaneous application of a voltage and shear between the substrates (alignment procedure 1) was carried out at temperatures cooling from 70° C. to 64° C.

low molecular weight ferroelectric liquid crystal A: 44 wt % ferroelectric liquid-crystalline polymer J: 20 wt %

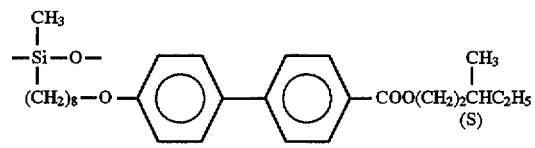

(both end groups of main chain: trimetylsilyl)
(Mw = 14000)

low molecular weight liquid crystal C: 18 wt %
low molecular weight liquid crystal D: 9 wt %
low molecular weight liquid crystal E: 9 wt %

According to observation of the liquid crystal display device with a polarized microscope, two kinds of liquid crystal phases were observed. When a pulse voltage of 30 V and 200 μs having the same wave form as that as shown in FIG. 6(a) at 25° C. to observe the state of the liquid crystal cell before and after the application of the wave, the liquid crystal phase having the smaller occupation area (corresponds to the islands shown in FIG. 3 as described in Example 1) was not switched between light and dark, namely did not respond to electric field. On the other hand the liquid crystal phase having the larger occupation area (corresponds to the sea shown in FIG. 3 as described in Example 1) was switched between light and dark, namely responded to electric field. At that time, the intensity of transmittance was changed in the same manner as that shown in FIG. 6(b) in Example 1. This shows that only one of the two kinds of liquid crystal phase responded to electric field. When a pulse voltage of 30 V and 10 ms having the same form as that shown in FIG. 6(a) was applied to the liquid crystal display device, the liquid crystal display phase having the smaller occupation area did not responded.

The phase transfer behavior of the liquid crystal composition in each liquid crystal phase of the cell, the electric field response time (the time taken by the intensity of transmittance to change from 10% to 90%, $t_{10-90}$) of the cell and tilt angle are shown bellow.

liquid crystal composition whose main component consists of the low molecular weight liquid crystals A, C, D and E-ISO-( 69° C.)→SC*-(−50° C.)→glass liquid crystal composition whose main component consists of the ferroelectric liquid-crystalline polymer J-Iso-(72° C.)→Sc*

$t_{10-90}$=45 μs (25° C., 1 kHz, ±30 V)

Tilt angle 2θ=53° (25° C.)

($t_{10-90}$ at 0° C.)/($t_{10-90}$ at 40° C.)=13 ±(30 V)

Example 6

A liquid crystal display device containing a liquid crystal composition having the following composition was produced in the same manner as that employed for the production of the liquid crystal display device (1) of Example 1, except that the liquid-crystalline polymer B that was contained in the liquid crystal composition used for the production of the liquid crystal display device (1) of Example 1 was replaced by K and the simultaneous application of a voltage and shear between the substrates (alignment procedure 1) was carried out at temperatures cooling from 65° C. to 52° C.

low molecular weight ferroelectric liquid crystal A: 48 wt % liquid-crystalline polymer K: 20 wt %

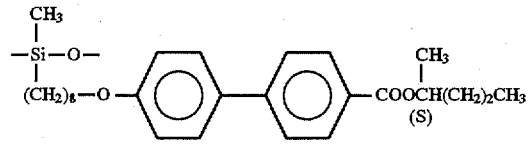

(both end groups of main chain: trimethylsilyl)
(Mw = 32000)

low molecular weight liquid crystal C: 16 wt %
low molecular weight liquid crystal D: 8 wt %
low molecular weight liquid crystal E: 8 wt %

According to observation of the liquid crystal display device with a polarized microscope, two kinds of liquid crystal phases were observed. When a pulse voltage of 30 V and 200 μs having the same wave form as that as shown in FIG. 6(a) at 25° C. to observe the state of the liquid crystal cell before and after the application of the wave, the liquid crystal phase having the smaller occupation area (corresponds to the islands shown in FIG. 3 as described in Example 1) was not switched between light and dark, namely did not respond to electric field. On the other hand the liquid crystal phase having the larger occupation area (corresponds to the sea shown in FIG. 3 as described in Example 1) was switched between light and dark, namely responded to electric field. At that time, the intensity of transmittance was changed in the same manner as that shown in FIG. 6(b) in Example 1. This shows that only one of the two kinds of liquid crystal phase responded to electric field. When a pulse voltage of 30 V and 10 ms having the same form as that shown in FIG. 6(a) was applied to the liquid crystal display device, the liquid crystal display phase having the smaller occupation area did not responded.

The phase transfer behavior of the liquid crystal composition in each liquid crystal phase of the cell, the electric field response time (the time taken by the luminous energy of transmitted light to change from 10% to 90%, $t_{10-90}$) of the cell and tilt angle are shown bellow.

liquid crystal composition whose main component consists of the low molecular weight liquid crystals A, C, D and E-Iso (70° C.) Sc* (−47° C.) glass liquid crystal composition whose main component consists of the ferroelectric liquid-crystalline polymer K-Iso-(57° C.)→Sc*

$t_{10-90}$=50 μs (25° C., 1 kHz, ±30 V)

Tilt angle 2θ=58° (25° C.)

($t_{10-90}$ at 0° C.)/($t_{10-90}$ at 40° C.)=17 ±(30 V)

Example 7

A liquid crystal display device containing a liquid crystal composition having the following composition was produced in the same manner as that employed for the production of the liquid crystal display device (1) of Example 1, except that the liquid-crystalline polymer B that was contained in the liquid crystal composition used for the production of the liquid crystal display device (1) of Example 1 was replaced by L and the simultaneous application of a voltage and shear between the substrates (alignment procedure 1) was carried out at temperatures cooling from 75° C. to 65° C.

low molecular weight ferroelectric liquid crystal A: 48 wt % liquid-crystalline polymer L: 20 wt %

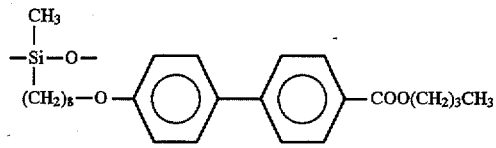

(both end groups of main chain: trimethylsilyl)
(Mw = 33000)

low molecular weight liquid crystal C: 16 wt %
low molecular weight liquid crystal D: 8 wt %
low molecular weight liquid crystal E: 8 wt %

According to observation of the liquid crystal display device with a polarized microscope, two kinds of liquid crystal phases were observed. When a pulse voltage of 30 V and 200 μs having the same wave form as that as shown in FIG. 6(a) at 25° C. to observe the state of the liquid crystal cell before and after the application of the wave, the liquid crystal phase having the smaller occupation area (corresponds to the islands shown in FIG. 3 as described in Example 1) was not switched between light and dark, namely did not respond to electric field. On the other hand the liquid crystal phase having the larger occupation area (corresponds to the sea shown described in FIG. 3 as described in Example 1) was switched between light and dark, namely responded to electric field. At that time, the intensity of transmittance was changed in the same manner as that shown in FIG. 6(b) in Example 1. This shows that only one of the two kinds of liquid crystal phase responded to electric field. When a pulse voltage of 30 V and 10 ms having the same form as that shown in FIG. 6(a) was applied to the liquid crystal display device, the liquid crystal display phase having the smaller occupation area did not responded.

The phase transfer behavior of the liquid crystal composition in each liquid crystal phase of the cell, the electric field response time (the time taken by the intensity of transmittance to change from 10% to 90%, $t_{10-90}$) of the cell and tilt angle are shown bellow.

liquid crystal composition whose main component consists of the low molecular weight liquid crystals A, C, D and E-Iso-(70° C.)→$S_A$-(64° C.)→Sc*-(−49° C.)→glass liquid crystal composition whose main component consists of the liquid-crystalline polymer L-Iso-(80° C.)→$S_A$-(62° C.)→Sc $t_{10-90}$=120 μs (25° C., 1 kHz, ±30 V)

Tilt angle θ2=55° (25° C.)

($t_{10-90}$ at 0° C.)/($t_{10-90}$ at 40° C.)=11 (+30 V)

Example 8

A liquid crystal display device containing a liquid crystal composition having the following composition was produced in the same manner as that employed for the production of the liquid crystal display device (1) of Example 1, except that, as liquid crystal materials, 108 mg of M, 14 mg of N, 36 mg of C, 9 mg of E, 27 mg of I and 6 mg of O were used and the simultaneous application of a voltage and shear between the substrates (alignment procedure 1) was carried out at temperatures cooling from 78° C. to 70° C.

low molecular weight ferroelectric liquid crystal M: 54 wt %

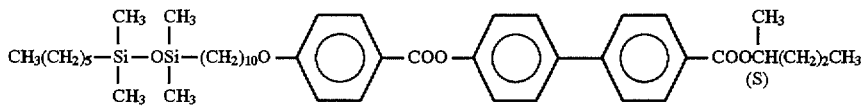

ferroelectric liquid-crystalline polymer N: 7 wt %

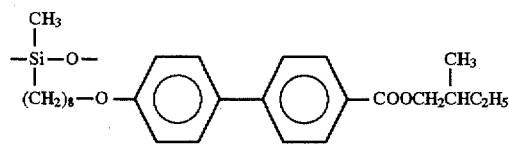

(both ends of main chain: trimethylsilyl)
(Mw = 14000)

(synthesized from 10 mol % of S-monomer and 90 mol % of racemic monomer)

low molecular weight liquid crystal C: 18 wt %
low molecular weight liquid crystal E: 4.5 wt %
low molecular weight liquid crystal I: 13.5 wt %
ferroelectric liquid-crystalline polymer O: 3 wt %

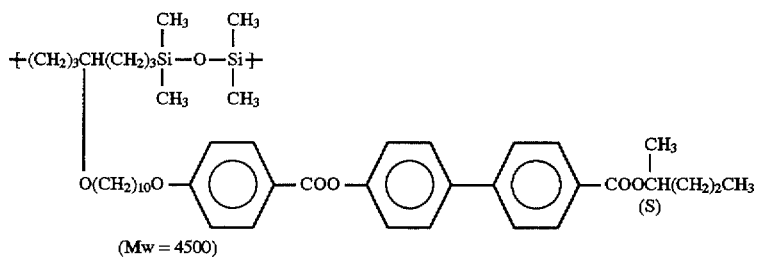

(Mw = 4500)

According to observation of the liquid crystal display device with a polarized microscope, two kinds of liquid crystal phases were observed. When a pulse voltage of 30 V and 200 μs having the same wave form as that as shown in FIG. 6(a) at 25° C. to observe the state of the liquid crystal cell before and after the application of the wave, the liquid crystal phase having the smaller occupation area (corresponds to the islands shown in FIG. 3 as described in Example 1) was not switched between light and dark, namely did not respond to electric field. On the other hand the liquid crystal phase having the larger occupation area (corresponds to the sea shown in FIG. 3 as described in Example 1) was switched between light and dark, namely responded to electric field. At that time, the intensity of transmittance was changed in the same manner as that shown in FIG. 6(b) in Example 1. This shows that only one of the two kinds of liquid crystal phase responded to electric field.

When a pulse voltage of 30 V and 10 ms having the same form as that shown in FIG. 6(a) was applied to the liquid crystal display device, the liquid crystal display phase having the smaller occupation area did not responded. The contrast ratio at that time was 30.

A voltage of 30 V was applied to the liquid crystal display device at 60° C. for five seconds. After the voltage was cut off, the liquid crystal display device was cooled to room temperature. When a voltage as shown in FIG. 4(a) was then applied at 25° C., the intensity of transmittance was not changed in the same manner as that shown in FIG. 4(b) but changed in the same manner as that shown in FIG. 6(b). This indicates that the liquid crystal phase whose main component is the ferroelectric liquid-crystalline polymer N had been transferred to a high-order phase and no longer responded to electric field.

The contrast ratio at that time was 51, which shows that equalizing the alignment direction of the slowly responding liquid crystal phase to one of the two alignment directions of the quickly responding liquid crystal phase increases contrast.

The phase transfer behavior of the liquid crystal composition in each liquid crystal phase of the cell, the electric field response time (the time taken by the intensity of transmittance to change from 10% to 90%, $t_{10-90}$) of the cell and tilt angle are shown bellow.

liquid crystal composition whose main component consists of the ferroelectric liquid-crystalline polymer N-Iso-(72° C.)→Sc* liquid crystal composition whose main component consists of the low molecular weight ferroelectric liquid crystal M, low molecular weight liquid crystals C, E and I and the ferroelectric liquid-crystalline polymer O-Iso-(78° C.)→Sc*-(−50° C.)→glass $t_{10-90}$=64 μs (25° C., 1 kHz, ±30 V)

Tilt angle 2θ=50° (25° C.)

($t_{10-90}$ at 0° C.)/($t_{10-90}$ at 40° C.)=16 (±30 V)

What is claimed is:

1. A liquid crystal display device, comprising a liquid crystal which is disposed between a couple of substrates bearing on their surfaces facing each other their respective electrode structures, at least one of the substrates being transparent, the liquid crystal in each display element comprising at least two oriented liquid crystal phases, the liquid crystal phases including a most-quickly-responding liquid crystal phase comprising as a main component a ferroelectric liquid crystal material and responding to an electric field at the shortest response time A and a most-slowly-responding liquid crystal phase comprising as a main component a ferroelectric liquid-crystalline polymer and responding to the same electric field at the longest response time B, the response time A being at most 1/50 times as long as the response time B, when all the liquid crystal phases have layer structures having layer normal lines, the layer normal lines being directed in one direction, when none of the liquid crystal phases have a layer structure, all the liquid crystal phases being aligned in one direction, when one or more of the liquid crystal phases have layer structures having layer normal lines and one or more of the liquid crystal phases have no layer structure, the layer normal lines of the former liquid crystal phases and the alignment of the latter liquid crystal phases being directed in one direction, the ferroelectric liquid crystal material comprising a compound (A) selected from the group consisting of a compound represented by the following general formula (I)

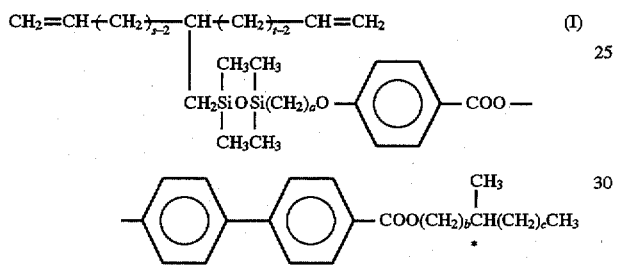

wherein, s and t are each independently an integer of 2 to 5, a is an integer of 4 to 16, b is an integer of 0 to 3, c is an integer of 1 to 7 and * indicates an asymmetric carbon atom, and a compound represented by the following general formula (IIb)

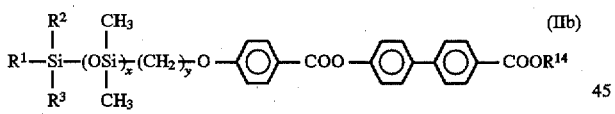

wherein, $R^1$ is an alkyl group of 1 to 20 carbon atoms, $R^2$ and $R^3$ are each independently an alkyl group of 1 to 6 carbon atoms, x is an integer of 1 to 5, y is an integer of 3 to 20 and $R^{14}$ is an optically active alkyl group of 4 to 10 carbon atoms, or comprising the compound (A) and a compound (B) selected from the group consisting of a compound having smectic C phase and being represented by the following general formula (III)

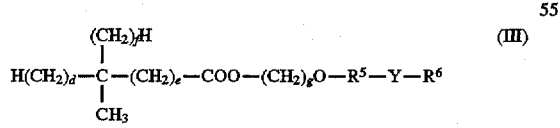

wherein, $R^5$ is

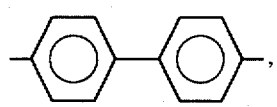

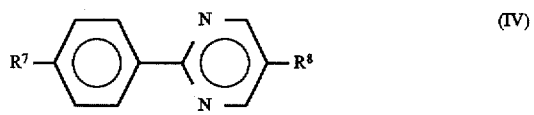

$R^6$ is an optically inactive alkyl group of 4 to 20 carbon atoms, d is an integer of 0 to 10, e is an integer of 0 to 10, f is an integer of 1 to 10, g is an integer of 1 to 20, and Y is a single bond, —O—, —COO— or —OCO—, and a compound having smectic C phase and being represented by the following general formula (IV), (V), (VI), or (VII)

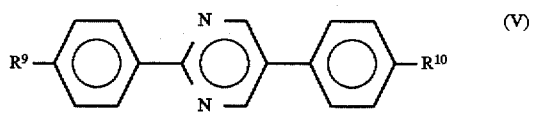

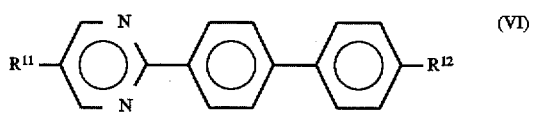

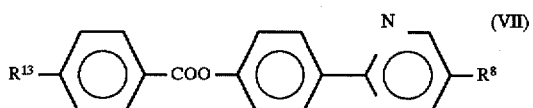

wherein, $R^7$ is an optically inactive alkyl, alkoxyl, alkoxycarbonyl or acyloxy group of 6 to 15 carbon atoms, $R^8$ is an optically inactive alkyl or alkoxy group of 6 to 12 carbon atoms, $R^9$ and $R^{10}$ are each independently an optically inactive alkyl group or alkoxy group of 4 to 14 carbon atoms, $R^{11}$ is an optically inactive alkyl group of 4 to 14 carbon atoms, $R^{12}$ is an optically inactive alkyl or alkoxyl group of 4 to 14 carbon atoms, and $R^{13}$ is an optically inactive alkyl or alkoxyl group of 6 to 20 carbon atoms, and the ferroelectric liquid-crystalline polymer having a repeating unit represented by the following general formula (VIII)

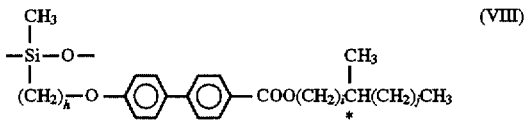

(VIII)

wherein, h is an integer of 8 to 10, i is 1 or 2, j is 1 or 2, and * indicates an asymmetric carbon atom.

2. The liquid crystal display device of claim 1, wherein in at least one area between the substrates, the most-slowly-responding liquid crystal phase is present continuously in a direction perpendicular to the substrates.

3. The liquid crystal display device of claim 1, wherein the ferroelectric liquid-crystalline polymer has a weight average molecular weight of 2,000 to 200,000.

4. The liquid crystal display device of any one of claims 1, 2 and 3, wherein the liquid crystal in each picture element consists of two aligned liquid crystal phases.

5. A method of driving the liquid crystal display device of claim 1, comprising applying between the electrode structures a pulse voltage having a voltage and a pulse duration which are sufficient to drive the most-quickly-responding liquid crystal phase but are insufficient to drive the most-slowly-responding liquid crystal phase.

6. The method of claim 5, wherein before the pulse voltage having a voltage and a pulse duration, which are sufficient to drive the most-quickly-responding liquid crystal phase but are insufficient to drive the most-slowly-responding liquid crystal phase, is applied between the electrode structures, a pulse voltage having a voltage and a pulse duration, which are sufficient for the most-slowly-responding liquid crystal phase to respond, is applied between the electrode structures to equalize the direction of the alignment of the most-slowly-responding liquid crystal phase to the direction of one of two kinds of alignment of the most-quickly-responding liquid crystal phase which will be switched therebetween in a driving state of the liquid crystal display device.

7. The method of any one of claims 5 and 6, wherein the liquid crystal in each display element consists of two aligned liquid crystal phases.

8. A liquid crystal display device which is produced by cooling or allowing the liquid crystal display device of any one of claims 1, 2 and 3, to or at a temperature ranging from −40° to 30° C., so that the most-slowly-responding liquid crystal phase is transferred to a frozen glass state or a high-order smectic phase which does not respond to electric field and maintains the frozen glass state or the high-order smectic phase when the liquid crystal display device is driven.

9. The liquid crystal display device of claim 8, wherein the liquid crystal in each picture element consists of two aligned liquid crystal phases.

10. A liquid crystal display device which is produced by applying an electric field to the liquid crystal display device of any one of claims 1, 2 and 3 in one direction between the electrode structure of the substrates of liquid crystal display device while the most-slowly-responding liquid crystal phase is exhibiting a ferroelectric phase, so that the alignment direction of the most-slowly-responding liquid crystal phase is equalized to one of two alignment directions of the most-quickly-responding liquid crystal phase which will be switched therebetween in a driving state, and, while the electric field is being applied or after the application of the electric field is stopped, cooling or allowing the liquid crystal display device to or at a temperature ranging from −40° to 30° C., so that the most-slowly-responding liquid crystal phase is transferred to a frozen glass state or a high-order smectic phase which does not respond to electric field and maintains the frozen glass state or the high-order smectic phase when the liquid crystal display device is driven.

11. The liquid crystal display device of claim 10 wherein the liquid crystal in each picture element consists of two aligned liquid crystal phases.

12. The method of claim 5, wherein the ferroelectric liquid-crystalline polymer has a weight average molecular weight of 2,000 to 200,000.

13. The method of claim 5, wherein the liquid crystal in each picture element consists of two aligned liquid crystal phases.

14. A liquid crystal composition which separates into at least two liquid crystal phases having different response times to an electric field, the liquid crystal phases including a most-quickly-responding liquid crystal phase comprising as a main component a ferroelectric liquid crystal material and responding to an electric field at the shortest response time A and a most-slowly-responding liquid crystal phase comprising as a main component a ferroelectric liquid-crystalline polymer and responding to the same electric field at the longest response time B, the response time A being at most 1/50 times as long as the response time B, the ferroelectric liquid crystal material comprising a compound (A) selected from the group consisting of a compound represented by the following general formula (I)

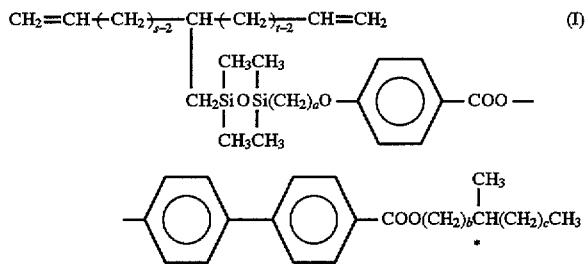

(I)

wherein s and t are each independently an integer of 2 to 5, a is an integer of 4 to 16, b is an integer of 0 to 3, c is an integer of 1 to 7 and * indicates an asymmetric carbon atom, and a compound represented by the following general formula (IIb)

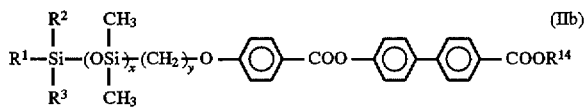

(IIb)

wherein, $R^1$ is an alkyl group of 1 to 20 carbon atoms, $R^2$ and $R^3$ are each independently an alkyl group of 1 to 6 carbon atoms, x is an integer of 1 to 5, y is an integer of 3 to 20 and $R^{14}$ is an optically active alkyl group of 4 to 10 carbon atoms, comprising the compound (A) and a compound (B) selected from the group consisting of a compound having smectic C phase and being resented by the following general formula (III)

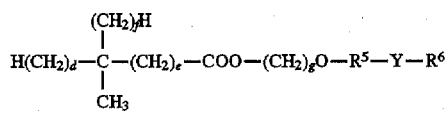  (III)

wherein, $R^5$ is

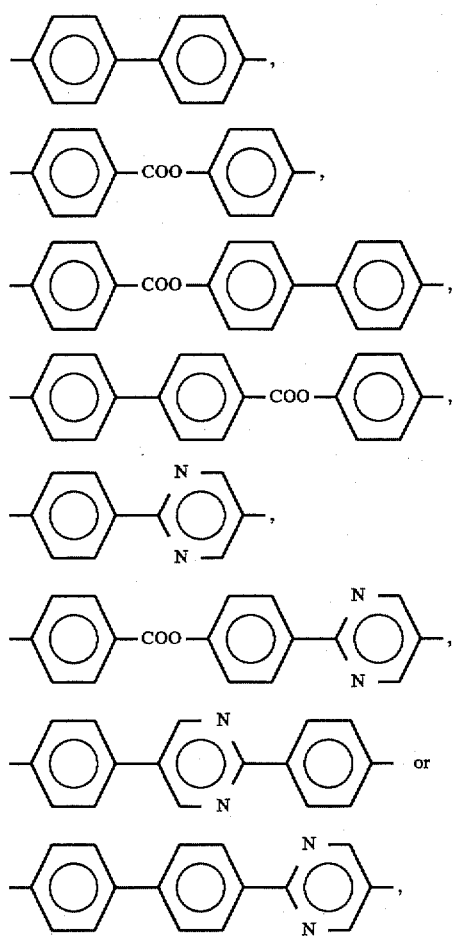

$R^6$ is optically inactive alkyl group of 4 to 20 carbon atoms, d is an integer of 0 to 10, e is an integer of 0 to 10, f is an integer of 1 to 10, g is an integer of 1 to 20, and Y is a single bond, —O—, —COO— or —OCO—, and a compound having smectic C phase and being represented by the following general formula (IV), (V), (VI), or (VII)

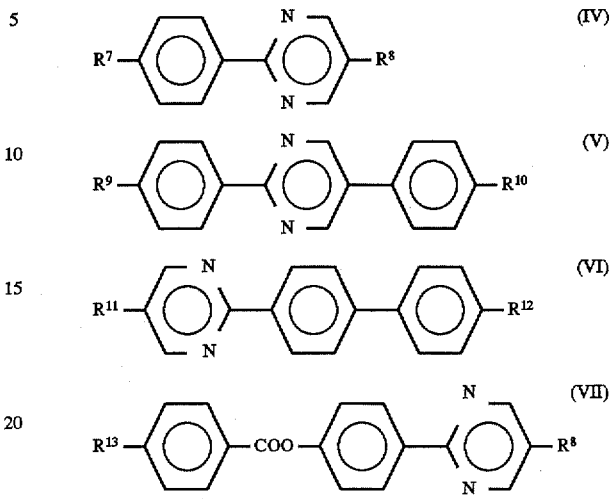

wherein, $R^7$ is an optically inactive alkyl, alkoxyl, alkoxycarbonyl or acyloxy group of 6 to 15 carbon atoms, $R^8$ is an optically inactive alkyl or alkoxyl group of 6 to 12 carbon atoms, $R^9$ and $R^{10}$ are each independently an optically inactive alkyl or alkoxyl group of 4 to 14 carbon atoms, $R^{11}$ is an optically inactive alkyl group of 4 to 14 carbon atoms, $R^{12}$ is an optically inactive alkyl or alkoxyl group of 4 to 14 carbon atoms, and $R^{13}$ is an optically inactive alkyl or alkoxyl group of 6 to 20 carbon atoms, and the ferroelectric liquid-crystalline polymer having a repeating unit represented by the following general formula (VIII)

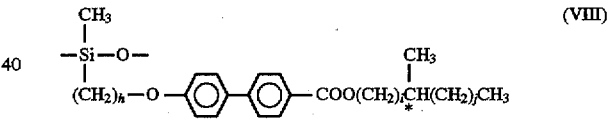 (VIII)

wherein, h is an integer of 8 to 10, i is 1 or 2, j is 1 or 2, and * indicates an asymmetric carbon atom.

15. The liquid crystal composition of claim 14, which separates into two liquid crystal phases.

* * * * *